United States Patent
Ishibashi

(10) Patent No.: US 7,978,389 B2
(45) Date of Patent: Jul. 12, 2011

(54) OPTICAL SCANNING DEVICE AND IMAGE OUTPUT APPARATUS

(75) Inventor: Osamu Ishibashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/742,337

(22) PCT Filed: Oct. 6, 2008

(86) PCT No.: PCT/JP2008/068143
§ 371 (c)(1),
(2), (4) Date: May 11, 2010

(87) PCT Pub. No.: WO2009/069382
PCT Pub. Date: Jun. 4, 2009

(65) Prior Publication Data
US 2010/0284051 A1    Nov. 11, 2010

(30) Foreign Application Priority Data
Nov. 28, 2007  (JP) ................................. 2007-307511

(51) Int. Cl.
*G02B 26/08* (2006.01)
(52) U.S. Cl. ..................................... 359/208.1; 359/858
(58) Field of Classification Search .............. 359/205.1, 359/208.1–208.2, 726–732, 856–859
See application file for complete search history.

(56) References Cited

U.S. PATENT DOCUMENTS

| 3,771,850 A | 11/1973 | Casler |
| 4,832,429 A * | 5/1989 | Nagler ........................ 359/216.1 |
| 2008/0213703 A1 * | 9/2008 | Shafer et al. .................. 430/319 |

FOREIGN PATENT DOCUMENTS

| GB | 2 053 505 A | 2/1981 |
| JP | 2004-013103 | 1/2004 |
| JP | 2004-198500 | 7/2004 |
| JP | 2005-062358 | 3/2005 |
| JP | 2005-070708 | 3/2005 |
| JP | 2005-91671 | 4/2005 |
| JP | 2005-181927 | 7/2005 |

OTHER PUBLICATIONS

International Search Report dated Jan. 13, 2009.

* cited by examiner

*Primary Examiner* — James Phan
(74) *Attorney, Agent, or Firm* — Scully, Scott, Murphy & Presser, PC

(57) ABSTRACT

The present invention provides an optical scanning device that prevents a disadvantageous increase in device size. Transfer optical system 17 includes at least concave mirrors 19 and 20. Furthermore, transfer optical system 17 allows a light beam scanned by scan mirror 16 to enter the scan mirror again at least via concave mirrors 19 and 20. Then, scan mirror 16 scans and emits the laser light beam received via concave mirrors 19 and 20, to a plane of projection.

8 Claims, 29 Drawing Sheets

OPTICAL SCANNING DEVICE AND IMAGE OUTPUT APPARATUS

TECHNICAL FIELD

The present invention relates to an optical scanning device and an image input apparatus both of which allow a light beam to enter a scan mirror a plurality of times to increase a scan angle.

BACKGROUND ART

In connection with optical scanning devices used for image output apparatuses such as laser printers, copiers, or facsimile machines, techniques for increasing a scan angle have been proposed or put to practical use.

These techniques include an optical scanning device described in Patent Document 1. FIG. 1 is a diagram showing the configuration of the optical scanning device.

In FIG. 1, a transfer optical system includes concave mirror 671 with a plane of reflection directed toward scan mirror 651, and lens 672 located between concave mirror 671 and scan mirror 651. A light beam scanned by scan mirror 651 is guided to concave mirror 671 via lens 672. Furthermore, the light beam folded back by concave mirror 671 is guided to scan mirror 651 via lens 672. Thus, the light beam is scanned by scan mirror 651 again, and the resultant light beam is emitted toward a scan target surface. As a result, the scan angle of the emitted light beam is increased.
Patent Document 1: JP2005-62358A

DISCLOSURE OF THE INVENTION

Problems to Be Solved by the Invention

In the optical scanning device described in Patent Document 1, the light beam scanned by scan mirror 651 is folded back by concave mirror 671 via lens 672. This increases the distance from scan mirror 651 to a folding plane on which the light beam is folded back. For example, the distance from scan mirror 651 to the folding plane is about four times as long as the focal distance of the lens.

Therefore, the size of the device disadvantageously increases.

Thus, an object of the present invention is to provide an optical scanning device and an image output apparatus both of which allow the above-described disadvantageous increase in device size to be prevented.

Means for Solving the Problems

An optical scanning device according to the present invention comprises a scan mirror configured to reflect and scan an incident light beam, and a transfer optical system configured to receive the light beam scanned by the scan mirror and to allow the light beam to enter the scan mirror again. Furthermore, the transfer optical system comprises at least a first concave mirror and a second concave mirror, and allows the light beam scanned by the scan mirror to enter the scan mirror at least via the first concave mirror and the second concave mirror. The scan mirror scans and emits the light beam received via the first concave mirror and the second concave mirror, to a plane of projection.

Furthermore, an image output apparatus according to the present invention comprises the above-described optical scanning device, and an image signal output device configured to allow a light beam to enter the optical scanning device in accordance with an image signal.

Advantage of the Invention

The present invention enables the device to be miniaturized.

BEST MODE FOR CARRYING OUT THE INVENTION

Figure 1:
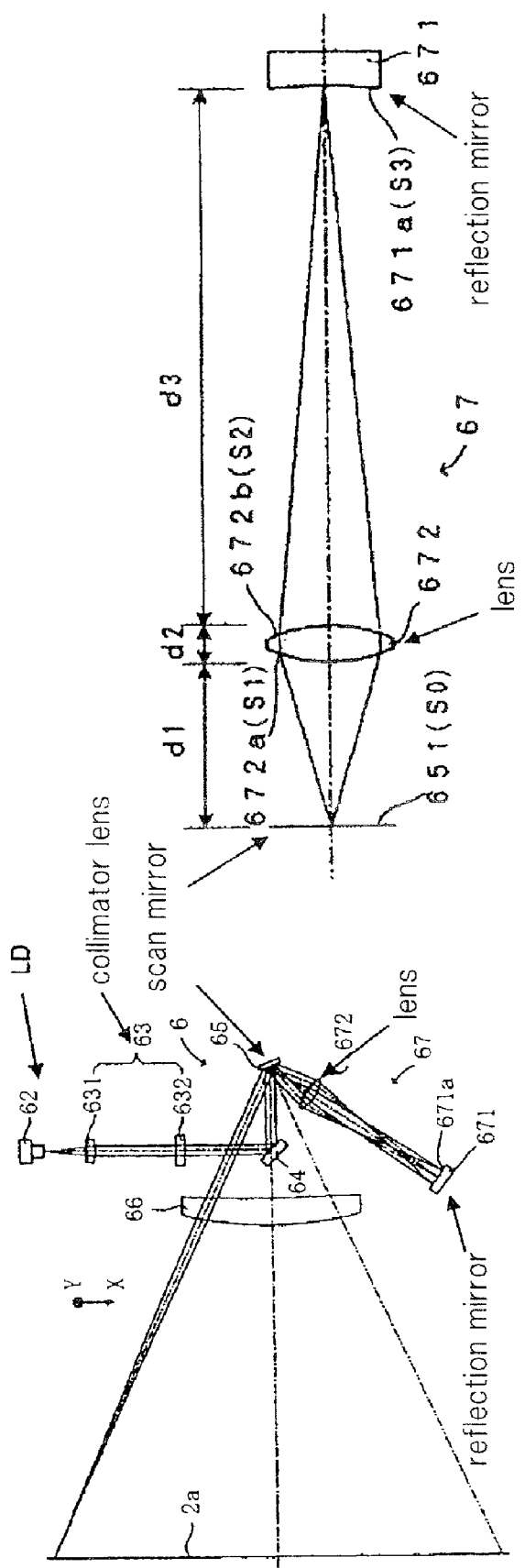
FIG. 1 is a diagram showing the configuration of a related optical scanning device.

Exemplary embodiments of the present invention will be described below with reference to the drawings. In the description below, components with the same functions are denoted by the same reference numerals throughout the drawings. Description of these components may be omitted.

First Exemplary Embodiment

Figure 2:
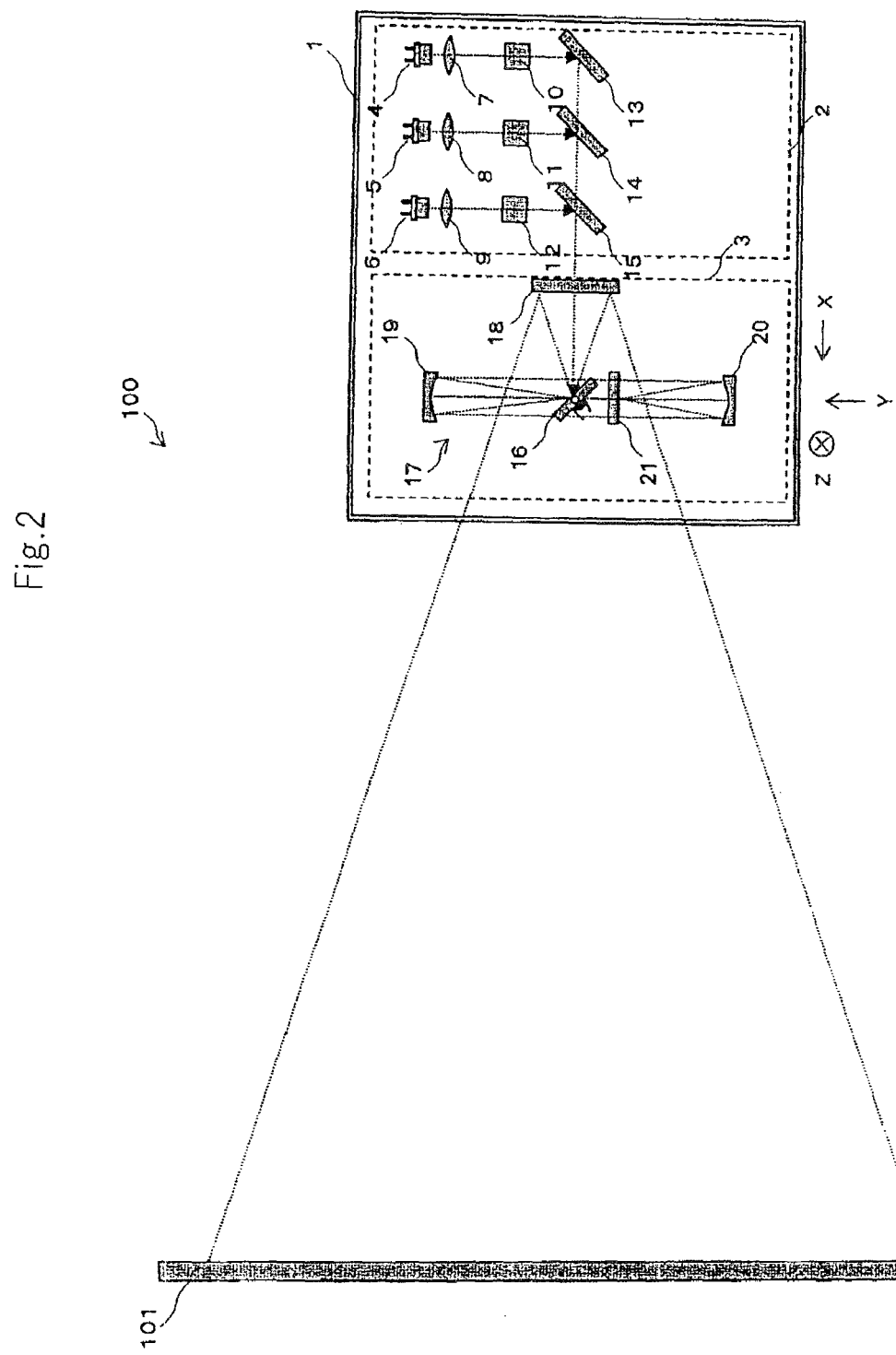
FIG. 2 is a diagram showing the configuration of a display system according to a first exemplary embodiment.

FIG. 2 is a diagram showing the configuration of a display system according to a first exemplary embedment.

In FIG. 2, display system 100 includes image projection apparatus 1 and screen 101.

Image projection apparatus 1 projects an image on screen 101. The image projection apparatus is an example of an image output apparatus.

Image projection apparatus 1 includes image signal output device 2 and optical scanning device 3.

Image signal output device 2 allows a laser beam to enter optical scanning device 3 in accordance with an input image signal. Specifically, image signal output device 2 includes laser light sources 4 to 6, collimators 7 to 9, modulators 10 to 12, reflection mirror 13, and dichroic mirrors 14 and 15.

Laser light sources 4 to 6 emit laser light beams having different wavelengths for, for example, red (R: 620 nm), green (G: 530 nm), and blue (B: 470 nm), in accordance with an input image signal.

Collimators 7 to 9 collimate laser light beams emitted by respective laser light sources 4 to 6 into parallel light beams with a desired diameter.

Modulators 10 to 12 modulate the intensities of the laser light beams collimated by respective collimators 7 to 9 in accordance with an input modulation signal.

Reflection mirror 13 totally reflects the laser light beam modulated by modulator 10. Furthermore, dichroic mirror 14 transmits the laser light beam reflected by reflection mirror 13, while totally reflecting the laser light beam modulated by modulator 11. Moreover, dichroic mirror 15 transmits the laser light beam reflected by reflection mirror 13 and dichroic mirror 14, while totally reflecting the laser light beam modulated by modulator 12.

Here, laser light sources 4 to 6, collimators 7 to 9, modulators 10 to 12, reflection mirror 13, and dichroic mirrors 14 and 15 are arranged such that the laser light beams reflected by reflection mirror 13 and dichroic mirrors 14 and 15 are multiplexed together on the same axis and such that the resultant light beam enters optical scanning device 3.

Optical scanning device 3 scans the laser light beam received from image signal output device 2, and projects the scanned laser light beam on screen 101. Specifically, optical scanning device 3 includes scan mirror 16, transfer optical system 17, and scan mirror 18.

Scan mirror 16 rotates reciprocatingly around a preset first axis of rotation to reflect the entered light beam, thus scanning the light beam in a first scanning direction (main scanning direction). In FIG. 2, the first scanning direction is a Y direction.

For example, scan mirror 16 scans and emits the laser light beam received from image signal output device 2, to transfer optical system 17. Furthermore, scan mirror 16 scans and emits the light beam received from transfer optical system 17, to scan mirror 18.

The light beam scanned by scan mirror 16 enters transfer optical system 17. Furthermore, transfer optical system 17 allows the incident light beam to enter scan mirror 17 again.

Scan mirror 18 rotates reciprocatingly around a second axis of rotation different from that of scan mirror 16. Scan mirror 18 thus scans the laser light beam received from scan mirror 16, in a second scanning direction (sub-scanning direction) different from the first scanning direction, to emit the resultant laser light beam to screen 101. The second scanning direction is a Z direction. Furthermore, a plane of incidence on scan mirror 18 on which the laser light beam received from scan mirror 16 is incident is an example of a plane of projection.

Thus, the three laser light beams having different wavelengths and having the intensities that are thereof modulated are two-dimensionally projected on screen 101 to form an image.

Now, transfer optical system 17 will be described.

Figure 3:
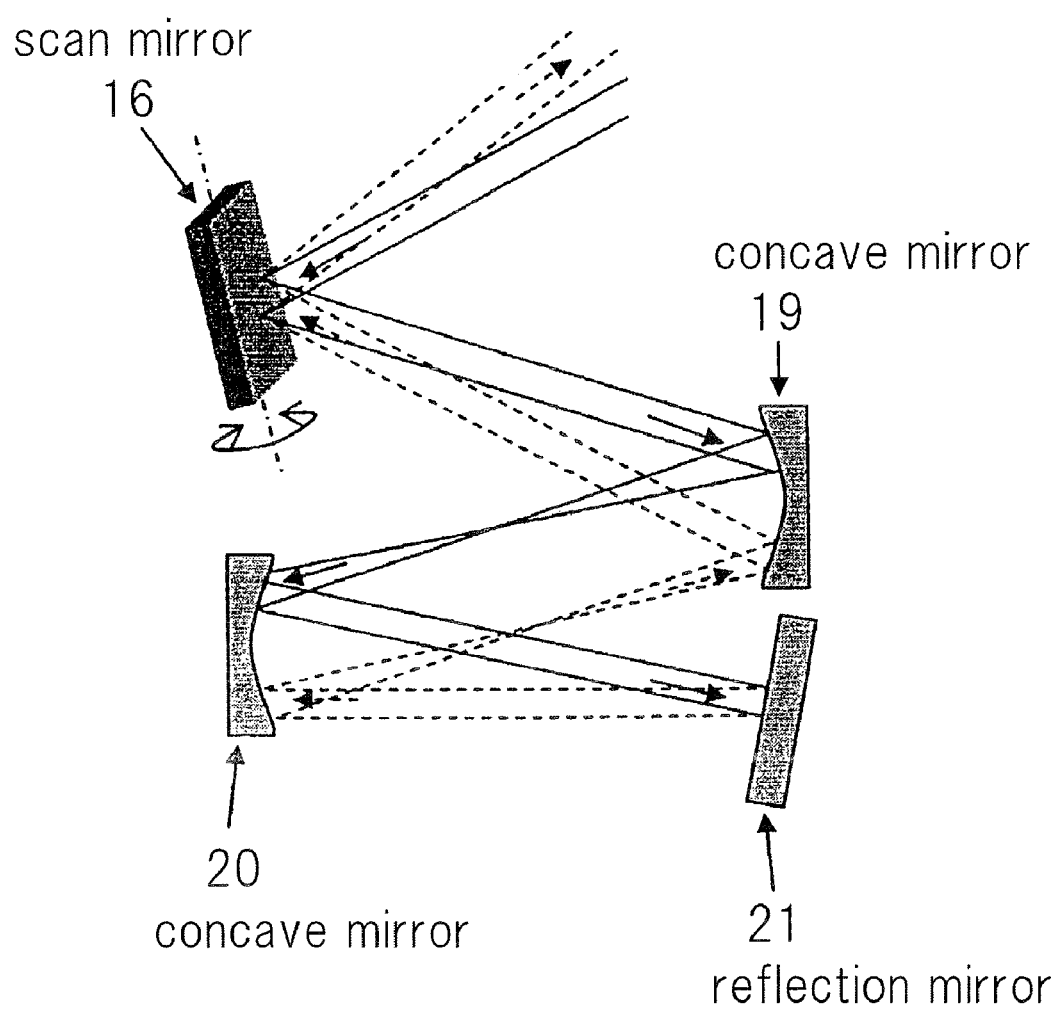
FIG. 3 is a schematic diagram showing the configuration of a transfer optical system according to the first exemplary embodiment.

FIG. 3 is a schematic diagram showing the configuration of transfer optical system 17.

In FIG. 3, transfer optical system 17 includes a plurality of mirrors with at least two concave mirrors.

Furthermore, transfer optical system 17 allows a light beam scanned by scan mirror 16 to enter scan mirror 16 again via the plurality of mirrors. Scan mirror 16 then scans and emits the light beam received via the plurality of mirrors, to scan mirror 18.

Specifically, the plurality of mirrors of transfer optical system 17 include concave mirrors 19 and 20 and reflection mirror 21. Concave mirror 19 is an example of a first concave mirror, and concave mirror 20 is an example of a second concave mirror.

Concave mirror 19 reflects the light beam scanned by scan mirror 16 so that the light beam enters concave mirror 20. Concave mirror 20 reflects the light beam received from concave mirror 19 so that the light beam enters reflection mirror 21. Subsequently, reflection mirror 21 reflects the light beam received from concave mirror 20 so that the light beam enters concave mirror 20. Concave mirror 20 reflects the light beam received from reflection mirror 21 so that the light beam enters concave mirror 19. Concave mirror 19 reflects the light beam received from concave mirror 20 so that the light beam enters scan mirror 16. Scan mirror 16 scans and emits the light beam received from concave mirror 19, to scan mirror 18.

Thus, the scan angle of scan mirror 16 can be increased without the use of a lens.

Now, the configuration of a transfer optical system 17 will be described below in detail.

The position of incidence of a laser light beam on scan mirror 16 and the position of incidence of a laser light beam on reflection mirror 21 are conjugate with respect to an optical system having concave mirrors 19 and 20.

If a light beam emitted from a point on an object (object point) is formed, via an optical system, into an image at a point on an image plane (image point) corresponding to the object point, the relationship between the object point and the image point is called conjugate. Here, the conjugate need not be precise but has only to meet a required accuracy.

To conjugate the position of incidence of a laser light beam on scan mirror 16 and the position of incidence of a laser light beam on reflection mirror 21, transfer optical system 17 may be configured, for example, as follows. In the description below, the focal distance of concave mirror 19 is defined as f0. The focal distance of concave mirror 20 is defined as f1.

First, the optical path length between scan mirror 16 and concave mirror 19 is equal to focal distance f0 of concave mirror 19. The optical path length between concave mirrors 19 and 20 is equal to the sum (f0+f1) of focal distance f0 of concave mirror 19 and focal distance f1 of concave mirror 20. The optical path length between concave mirror 20 and reflection mirror 21 is equal to focal distance f1 of concave mirror 20.

Furthermore, when a light beam traveling from scan mirror 16 into concave mirror 19 along a line joining the position of incidence of incident light beam D1 on scan mirror 16 with the center of concave mirror 19 is reflected from the center of concave mirror 19, the light beam is reflected from the center of concave mirror 20. Thereafter, the light beam is reflected by reflection mirror 21, then reflected from the center of concave mirror 20, then reflected from the center of concave mirror 19, and returns to the position of incidence on scan mirror 16.

Thus, the position of incidence of the laser light beam on scan mirror 16 is conjugate to the position of incidence of the laser light beam on reflection mirror 21.

Figure 4:
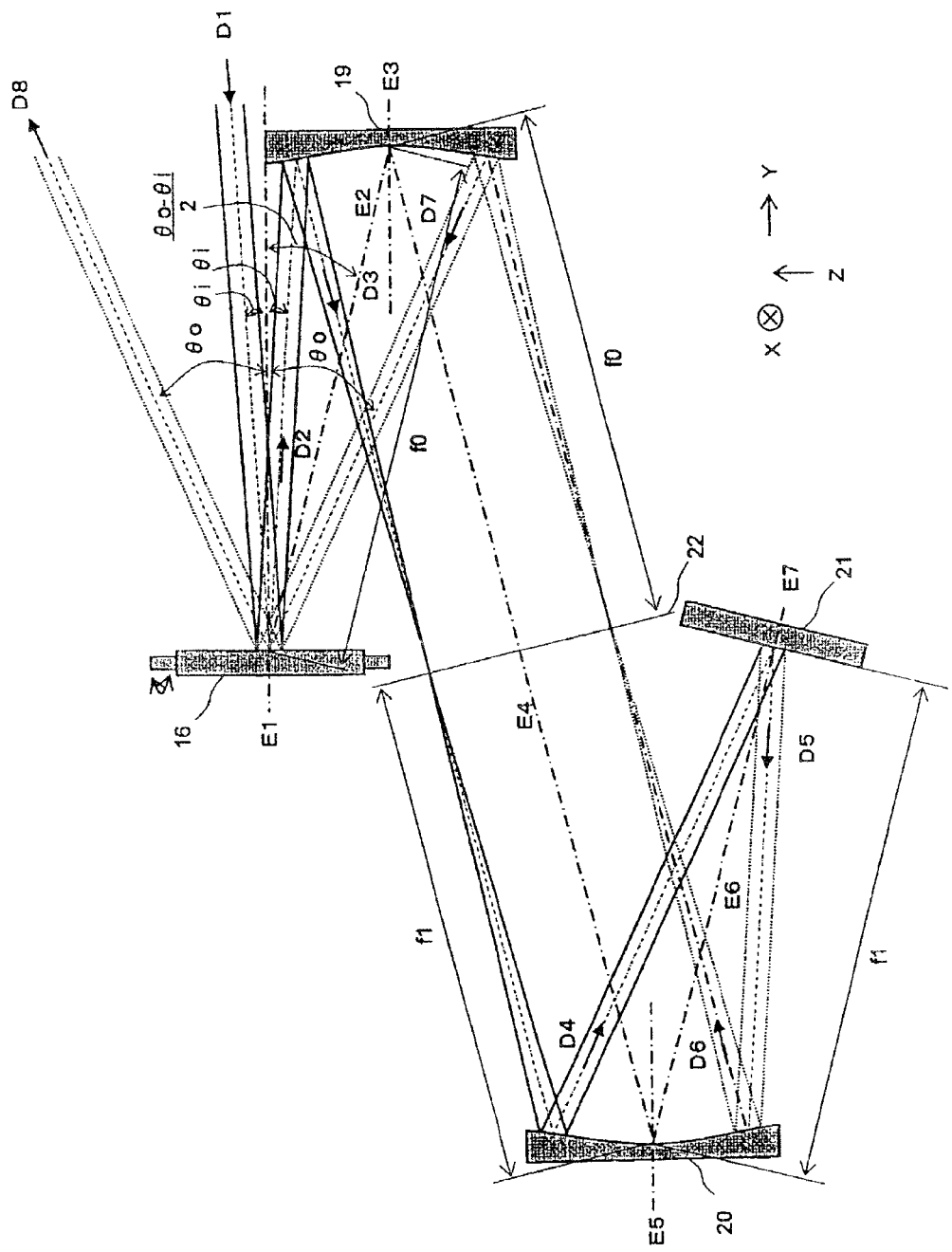
FIG. 4 is a diagram of the configuration of the transfer optical system according to the first exemplary embodiment as viewed in an X direction.
Figure 5:
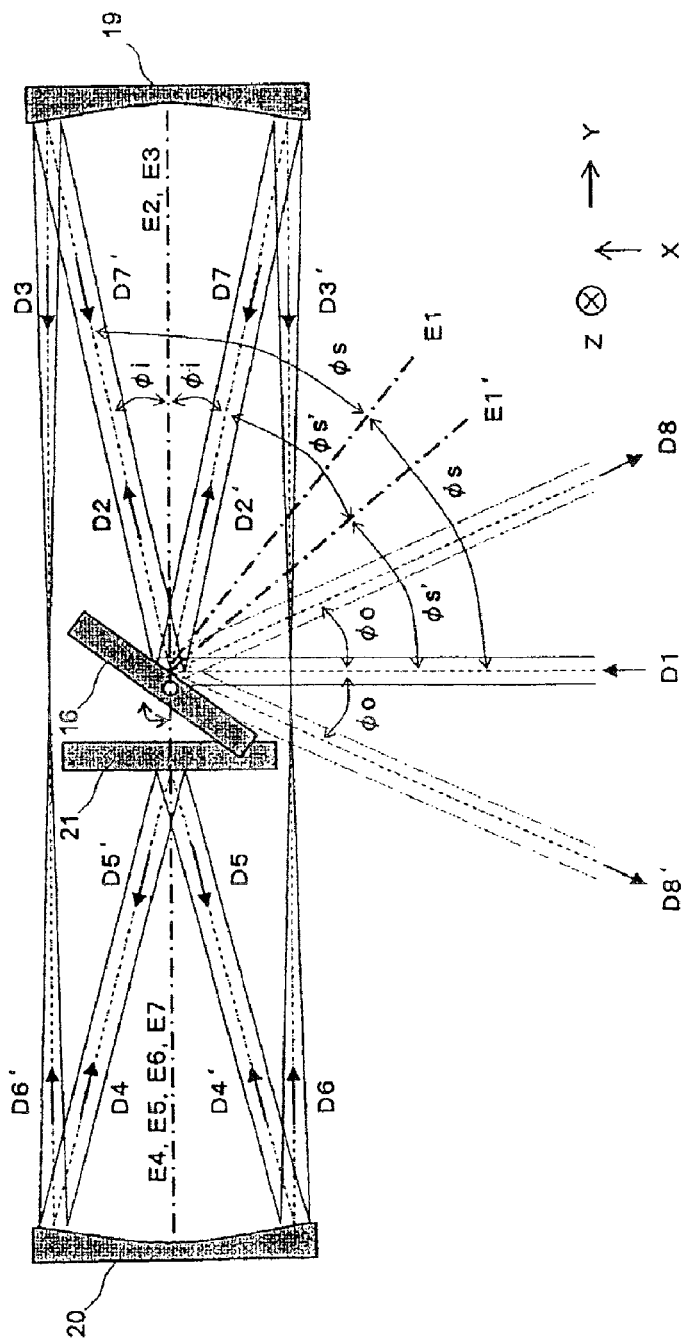
FIG. 5 is a diagram of the configuration of the transfer optical system according to the first exemplary embodiment as viewed in a Z direction.

Specifically, transfer optical system 17 may be configured as shown in FIG. 4 and FIG. 5. Here, FIG. 4 is a diagram of transfer optical system 17 as viewed in the X direction. Furthermore, FIG. 5 is a diagram of transfer optical system 17 as viewed in the Z direction.

First, the configuration of transfer optical system 17 as viewed in the X direction will be described with reference to FIG. 4. The angle between normal E1 of scan mirror 16 and incident light beam D1 entering scan mirror 16 is defined as $\theta i$. Moreover, the angle between normal E1 of scan mirror 16 and exit light beam D8 emitted to scan mirror 18 by scan mirror 16 is defined as $\theta o$.

The angle between normal E1 of scan mirror 16 and line E2 joining the center of scan mirror 16 with the center of concave mirror 19 is $(\theta o - \theta i)/2$. Furthermore, the distance between the center of scan mirror 16 and the center of concave mirror 19 is f0. Moreover, the angle between normal E3 of concave mirror 19 and line E2 joining the center of scan mirror 16 with the center of concave mirror 19 is $(\theta o - \theta i)/2$.

Furthermore, the angle between normal E3 of concave mirror 19 and line E4 joining the center of concave mirror 19 with the center of concave mirror 20 is $(\theta o - \theta i)/2$. Additionally, the distance between the center of concave mirror 19 and the center of concave mirror 20 is (f0+f1). Moreover, the angle between normal E5 of concave mirror 20 and line E4 joining the center of concave mirror 19 with the center of concave mirror 20 is $(\theta o - \theta i)/2$.

Furthermore, the angle between normal E5 of concave mirror 20 and line E6 joining the center of concave mirror 20 with the center of reflection mirror 21 is $(\theta o - \theta i)/2$. Additionally, the distance between the center of concave mirror 20 and the center of reflection mirror 21 is f1.

Moreover, the angle between normal E7 of reflection mirror 21 and line E6 joining the center of concave mirror 20 with the center of reflection mirror 21 is zero degree.

Now, the configuration of transfer optical system 17 as viewed in the Z direction will be described with reference to FIG. 5.

Light beams resulting from scanning of incident light beam D1 at maximum scan angles $\pm\phi i$ by scan mirror 16 are defined as D2 and D2', respectively.

The angle between line E2 joining the center of scan mirror 16 with the center of concave mirror 19 and the center line between light beams D2 and D2' is zero degree. Furthermore, the angle between normal E3 of concave mirror 19 and the center line between light beams D2 and D2' is zero degree.

Furthermore, the angle between normal E3 of concave mirror 19 and line E4 joining the center of concave mirror 19 with the center of concave mirror 20 is zero degree.

Additionally, the angle between normal E5 of concave mirror 20 and line E4 joining the center of concave mirror 19 with the center of concave mirror 20 is zero degree.

Furthermore, the angle between normal E5 of concave mirror 20 and line E6 joining the center of concave mirror 20 with the center of reflection mirror 21 is zero degree.

The angle between normal E7 of reflection mirror 21 and line E6 joining the center of concave mirror 20 with the center of reflection mirror 21 is zero degree.

(Description of Operation)

First, the operation of transfer optical system 17 as viewed in the X direction will be described with reference to FIG. 4.

Incident light beam D1 enters scan mirror 16 at angle $\theta i$ to normal E1 of scan mirror 16.

Subsequently, incident light beam D1 is reflected by scan mirror 16, and resultant light beam D2 enters concave mirror 19 at angle $\theta i$ to normal E3 of concave mirror 19.

Then, light beam D2 is reflected by concave mirror 19, and resultant light beam D3 is focused on focal plane 22 so as to have the minimum diameter. Thereafter, light beam D3 enters concave mirror 20 at angle $(\theta o - \theta i)/2$ to normal E5 of concave mirror 20. Focal plane 22 is positioned at distance f0 from concave mirror 19 along the optical path between concave mirrors 19 and 20.

Thereafter, light beam D3 is reflected by concave mirror 20, and resultant light beam D4 enters reflection mirror 21. Then, light beam D4 is collimated into parallel light by concave mirror 20.

Furthermore, light beam D4 is reflected by reflection mirror 21, and resultant light beam D5 enters concave mirror 20.

Then, light beam D5 is reflected by concave mirror 20, and resultant light beam D6 is focused on focal plane 22 so as to have the minimum diameter. Thereafter, light beam D6 enters concave mirror 19 at angle $(\theta o - \theta i)/2$ to normal E3 of concave mirror 19. Focal plane 22 is positioned at distance f1 from concave mirror 20 along the optical path between concave mirrors 20 and 19.

Subsequently, light beam D6 is reflected by concave mirror 19, and resultant light beam D7 enters scan mirror 16 at angle $\theta o$ to normal E1 of scan mirror 16. Then, light beam D7 is collimated into parallel light having the same diameter as that of light beam D1 by concave mirror 19.

Then, light beam D7 is reflected by scan mirror 16, and resultant light beam D8 is emitted to scan mirror 18 at angle $\theta o$ to normal E1 of scan mirror 16.

Now, the operation of transfer optical system 17 as viewed in the Z direction will be described with reference to FIG. 5.

Normals resulting from the maximum deflection of scan mirror 16 are defined as E1 and E1', respectively. Furthermore, the angle between incident light beam D1 and normal E1 of scan mirror 16 is defined as $\phi s$. The angle between incident light beam D1 and normal E1' of scan mirror 16 is defined as $\phi s'$.

First, a case where scan mirror 16 has normal E1 will be described.

In this case, incident light beam D1 enters scan mirror 16 at angle $\phi s$ to normal E1 of scan mirror 16.

Subsequently, incident light beam D1 is reflected by scan mirror 16, and resultant light beam D2 enters concave mirror 19 at angle $\phi i$ to normal E3 of concave mirror 19.

Then, light beam D2 is reflected by concave mirror 19, and resultant light beam D3 is focused on focal plane 22 so as to have the minimum diameter. Thereafter, light beam D3 enters concave mirror 20 at zero degree to normal E5 of concave mirror 20.

Thereafter, light beam D3 is reflected by concave mirror 20, and resultant light beam D4 enters reflection mirror 21. Then, light beam D4 is collimated into parallel light by concave mirror 20.

Furthermore, light beam D4 is reflected by reflection mirror 21, and resultant light beam D5 enters concave mirror 20.

Moreover, light beam D5 is reflected by concave mirror 20, and resultant light beam D6 is focused on focal plane 22 so as to have the minimum diameter. Thereafter, light beam D6 enters concave mirror 19 at zero degree to normal E3 of concave mirror 19.

Subsequently, light beam D6 is reflected by concave mirror 19, and resultant light beam D7 enters scan mirror 16 at angle ($\phi s - 2\phi i$) to normal E1 of scan mirror 16. Then, light beam D7 is collimated into parallel light having the same diameter as that of light beam D1 by concave mirror 19.

Then, light beam D7 is reflected by scan mirror 16, and resultant light beam D8 is emitted to scan mirror 18 at angle ($\phi s - 2\phi i$) to normal E1 of scan mirror 16. Thus, light beam D8 is emitted at angle $2\phi i$ to incident light beam D1.

Now, a case where scan mirror 16 has normal E1' will be described.

In this case, incident light beam D1 enters scan mirror 16 at angle $\phi s'$ to normal E1' of scan mirror 16.

Subsequently, incident light beam D1 is reflected by scan mirror 16, and resultant light beam D2' enters concave mirror 19 at angle $\phi i$ to normal E3 of concave mirror 19.

Then, light beam D2' is reflected by concave mirror 19, and resultant light beam D3' is focused on focal plane 22 so as to have the minimum diameter. Thereafter, light beam D3' enters concave mirror 20 at zero degree to normal E5 of concave mirror 20.

Thereafter, light beam D3' is reflected by concave mirror 20, and resultant light beam D4' enters reflection mirror 21. Then, light beam D4' is collimated into parallel light by concave mirror 20.

Furthermore, incident light beam D4' is reflected by reflection mirror 21, and resultant light beam D5' enters concave mirror 20.

Moreover, light beam D5' is reflected by concave mirror 20, and resultant light beam D6' is focused on focal plane 22 so as to have the minimum diameter. Thereafter, light beam D6' enters concave mirror 19 at zero degree to normal E3 of concave mirror 19.

Subsequently, light beam D6' is reflected by concave mirror 19, and resultant light beam D7' enters scan mirror 16 at angle ($\phi s' + 2\phi i$) to normal E1 of scan mirror 16. Then, light beam D7' is collimated into parallel light with the same diameter as that of light beam D1 by concave mirror 19.

Then, light beam D7' is reflected by scan mirror 16, and resultant light beam D8' is emitted at angle ($\phi s' + 2\phi i$) to normal E1 of scan mirror 16.

Thus, light beam D8' is emitted at angle $-2\phi i$ to incident light beam D1. Furthermore, as described above, light beam D8 is emitted at angle $2\phi i$ to incident light beam D1. Hence, the angle between light beams D8 and D8' is $4\phi i$. Therefore, the scan angle of scan mirror 16 can be doubled by transfer optical system 17.

Now, another example of the configuration of the display system according to the exemplary embodiment will be described.

Each of concave mirrors 19 and 20 has power in both the X and Z directions. However, the aspect in the example of the configuration described below wherein each of concave mirrors 19 and 20 has power only in the X direction will be described. The X direction extends along a scan line placed on concave mirrors 19 and 20 by scan mirror 16.

Figure 6:
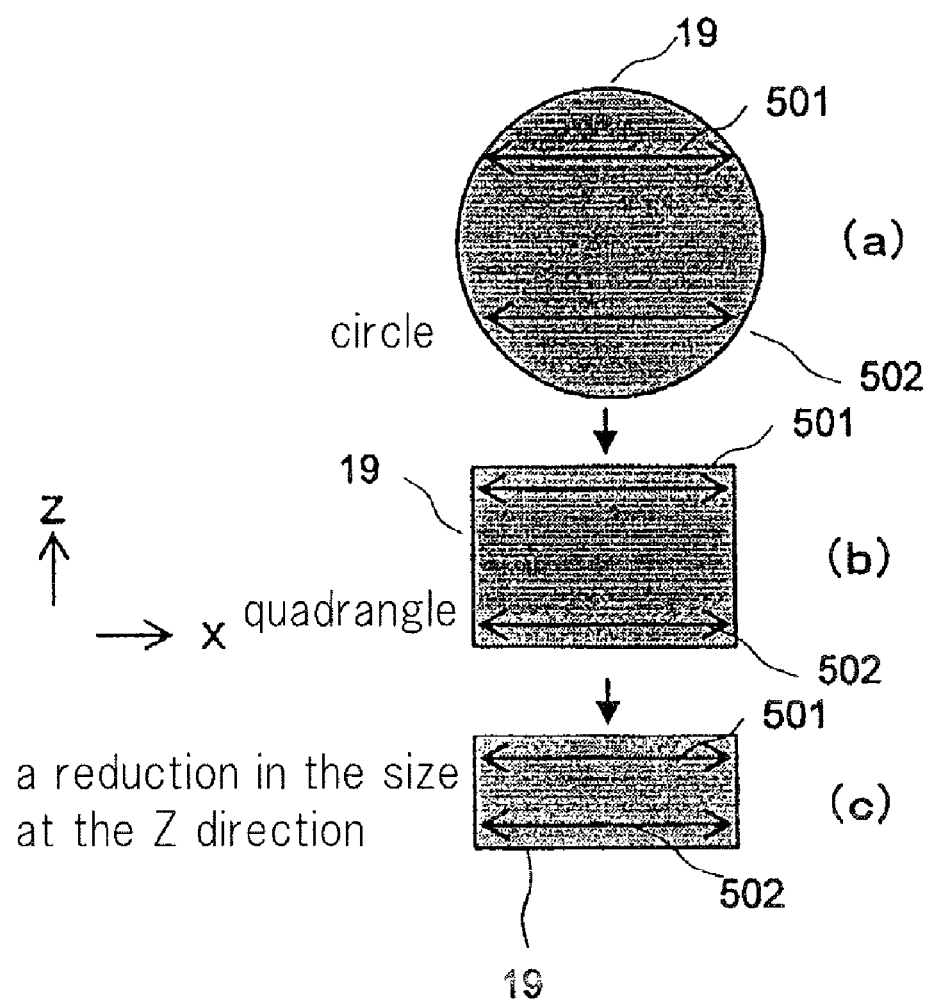
FIG. 6 is a diagram illustrating a concave mirror having power only in the X direction.

FIG. 6 is a diagram illustrating the concave mirror having power only in the X direction.

Here, concave mirror 19 will be described by way of example. FIG. 6 shows scan lines 501 and 502 placed on concave mirror 19 by scan mirror 16. Scan line 501 corresponds to a laser light beam received from scan mirror 16. Scan line 502 corresponds to a laser light beam received from concave mirror 20.

When having power in both the X and Z directions, concave mirror 19 can be shaped like a sphere. In this case, as viewed in the Y direction, concave mirror 19 forms a circle with a subtense corresponding to a scan line placed on concave mirror 19 by scan mirror 16, as shown in FIG. 6(a).

On the other hand, when having power only in the X direction, concave mirror 19 can be shaped like a cylinder. In this case, as viewed in the Y direction, concave mirror 19 forms a rectangle with a side corresponding to a scan line placed on concave mirror 19 by scan mirror 16, as shown in FIG. 6(b).

The rectangle is smaller than the circle with the subtense corresponding to the scan line. Thus, concave mirror 19 having power only in the X direction can be made smaller than concave mirror 19 having power in both the X and Z directions.

Moreover, as shown in FIG. 6(c), reducing the distance between scan lines 501 and 502 enables a reduction in the size of concave mirror 19 in the Z direction. Thus, the concave surface can further be miniaturized.

Figure 7:
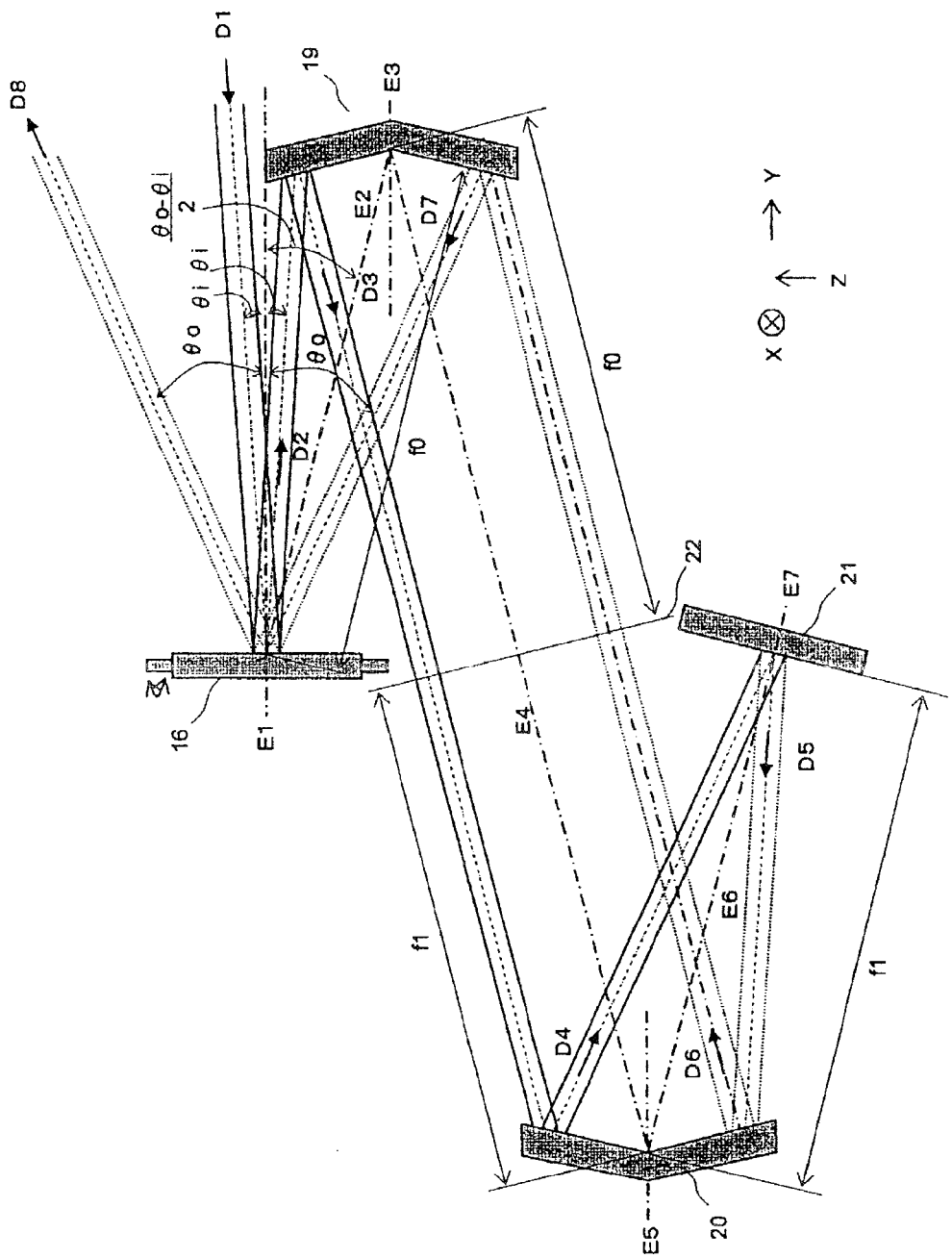
FIG. 7 is a diagram showing the configuration of the transfer optical system including a concave mirror having power only in the X direction.

FIG. 7 is a diagram showing the configuration of transfer optical system 17 including concave mirrors 19 and 20 having power only in the X direction. Specifically, FIG. 7 is a diagram of the configuration of transfer optical system 17 as viewed in the X direction.

In FIG. 7, concave mirror 19 has an elevation angle in a YZ plane in order to allow light beam D2 received from scan mirror 16 to enter concave mirror 20 and to allow light beam D6 received from concave mirror 20 to enter scan mirror 16.

Furthermore, concave mirror 20 has an elevation angle in the YZ plane in order to allow light beam D3 received from concave mirror 19 to enter reflection mirror 21 and to allow light beam D5 received from reflection mirror 21 to enter concave mirror 19.

Furthermore, in the exemplary embodiment, image projection apparatus 1 has been illustrated as an image output apparatus. However, the image output apparatus is not limited to the image projection apparatus but may be appropriately varied. For example, the image output apparatus may be an image forming apparatus such as a printer, a copier, or a facsimile machine.

Figure 8:
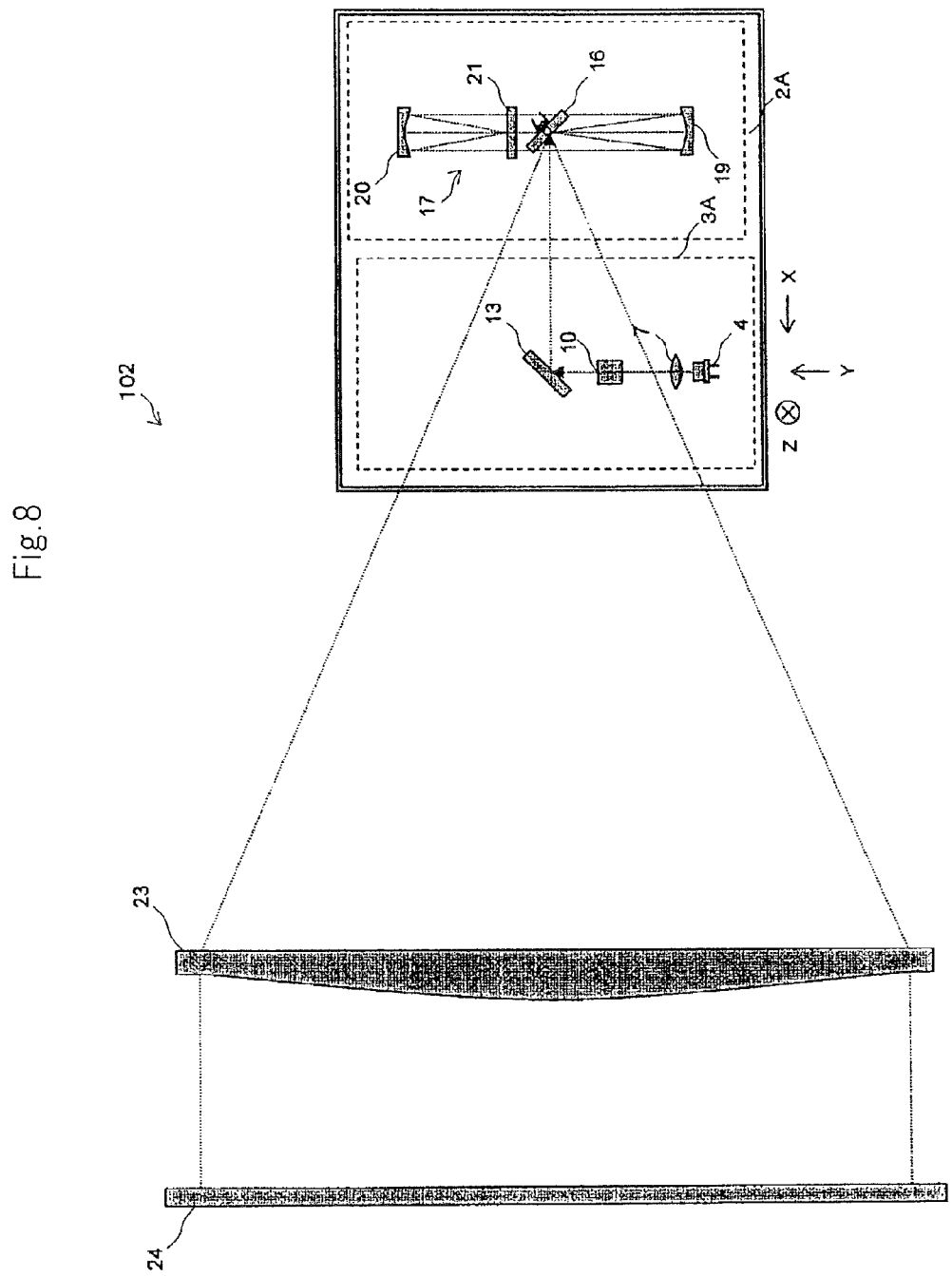
FIG. 8 is a diagram showing the configuration of an image forming apparatus.

FIG. 8 is a diagram showing the configuration of an image forming apparatus.

In FIG. 8, image forming apparatus 102 includes image signal output device 2A, optical scanning device 3A, fθ lens 23, and photosensitive member 24. Image signal output device 2A includes laser light source 4, collimator 7, modulator 10, and reflection mirror 13. Moreover, optical scanning device 3A includes scan mirror 16 and transfer optical system 17.

Scan mirror 16 scans and emits a laser light beam received from image signal output device 2A, to transfer optical system 17. Furthermore, scan mirror 16 scans and emits a light beam received from transfer optical system 17, to photosensitive member 24 via fθ lens 23. A plane of incidence on photosensitive member 24 on which a laser light beam received from scan mirror 16 is incident is an example of a plane of projection.

Effects of the Invention

According to the exemplary embodiment, transfer optical system 17 includes at least concave mirrors 19 and 20. Furthermore, transfer optical system 17 allows a light beam scanned by scan mirror 16 to enter the scan mirror again at least via concave mirrors 19 and 20. Then, scan mirror 16 scans and emits the laser light beam received via concave mirrors 19 and 20, to the plane of projection.

In this case, the laser light beam scanned by scan mirror 16 enters scan mirror 16 at least via concave mirrors 19 and 20. Furthermore, the laser light beam having entered scan mirror 16 at least via concave mirrors 19 and 20 is scanned and emitted by scan mirror 16.

Thus, the light beam scanned by scan mirror 16 can be allowed to enter scan mirror 16 again without the need for a lens. This enables the laser light beam scanned at a first scan angle to be emitted at a second scan angle larger than the first scan angle, without the need for a lens. Hence, the device can be miniaturized.

Furthermore, because a lens is not necessity, this enables optical scanning device 3 to be easily produced using, for example, a MEMS (Micro Electro Mechanical Systems).

Moreover, because a lens is not necessity, this enables possible chromatic aberration to be inhibited. Thus, for example, when optical scanning device 3 is used for the image output apparatus, possible color deviation in images can be inhibited.

Furthermore, in the exemplary embodiment, concave mirror 19 reflects the laser light beam scanned by scan mirror 16 so that the laser light beam enters concave mirror 20. Additionally, concave mirror 19 reflects the laser light beam received from concave mirror 20 so that the laser light beam enters scan mirror 16. Moreover, concave mirror 20 reflects the laser light beam received from concave mirror 19 so that the laser light beam enters reflection mirror 21. In addition, concave mirror 20 reflects the laser light beam received from reflection mirror 21 so that the laser light beam enters concave mirror 19. Then, reflection mirror 21 reflects the laser light beam received from concave mirror 20 so that the laser light beam enters concave mirror 20.

In this case, the laser light beam scanned by scan mirror 16 is reflected by concave mirror 19, then by concave mirror 20, and further by reflection mirror 21. Then, the laser light beam reflected by reflection mirror 21 is reflected by concave mirror 20 and then concave mirror 19 and subsequently enters scan mirror 16.

Thus, the size (the length in the Y direction) of the optical scanning device can be made smaller than the optical path length between concave mirrors 19 and 20.

For example, in the related art, the size (the distance from scan mirror 651 to a folding plane) of the optical scanning device is about four times as large as the focal distance of lens 672. In the exemplary embodiment, the size of the optical scanning device can be set equal to or smaller than the sum (f0+f1) of the focal distances of concave mirrors 19 and 20.

Furthermore, in the exemplary embodiment, each of concave mirrors 19 and 20 has power only in the direction (X direction) along the scan line placed on the concave mirror by scan mirror 16.

In this case, each of concave mirrors 19 and 20 can be shaped like a cylinder and thus miniaturized.

Furthermore, in the present embodiment, the position of incidence of the laser light beam on scan mirror 16 is conjugate to the position of incidence of the laser light beam on reflection mirror 21.

In this case, the laser light beam scanned at a particular position on scan mirror 16 enters reflection mirror 21 at a particular position. Furthermore, the laser light beam scanned at a particular position on reflection mirror 21 enters scan mirror 16 at a particular position.

This enables a reduction in the sizes of reflection areas of scan mirror 16 and reflection mirror 21, thus enabling the device to be further miniaturized.

Second Exemplary Embodiment

Figure 9:
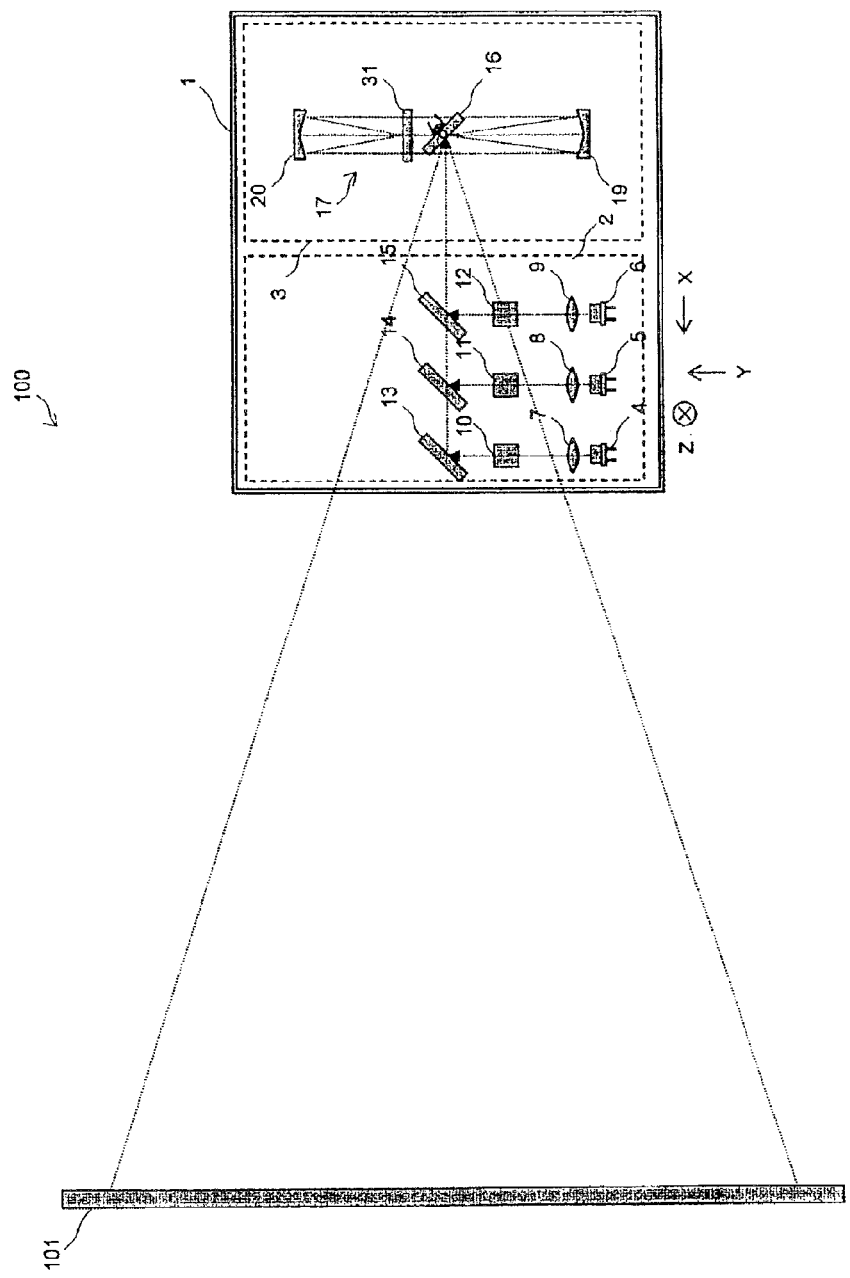
FIG. 9 is a diagram showing the configuration of a display system according to a second exemplary embodiment.

FIG. 9 is a diagram showing the configuration of a display system according to a second exemplary embodiment of the present invention.

In FIG. 9, optical scanning device 3 includes scan mirror 16 and transfer optical system 17.

Figure 10:
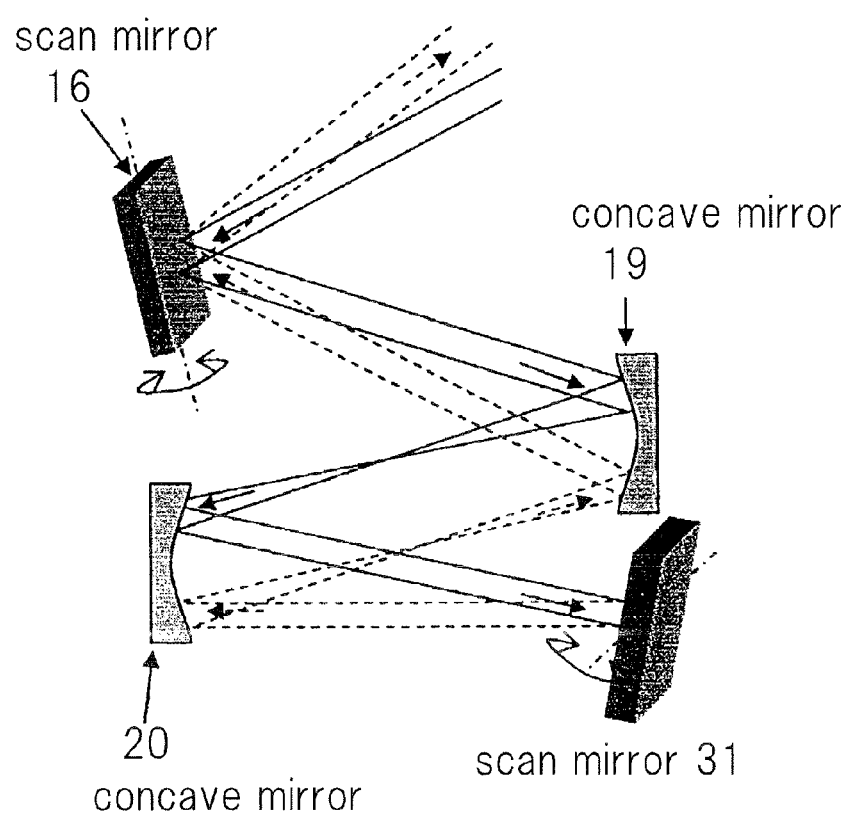
FIG. 10 is a schematic diagram showing the configuration of a transfer optical system according to the second exemplary embodiment.

FIG. 10 is a schematic diagram showing the configuration of transfer optical system 17 according to the exemplary embodiment. In FIG. 10, a plurality of mirrors of transfer optical system 17 include concave mirrors 19 and 20 and scan mirror 31.

Each of concave mirrors 19 and 20 has power in both the X and Z directions.

Scan mirror 31 reflects and scans a laser light beam received from concave mirror 20, in a second scanning direction. The laser light beam thus enters concave mirror 20. Scan mirror 31 is an example of a first reflection mirror.

Furthermore, the position of incidence of a laser light beam on scan mirror 16 is conjugate to the position of incidence of a laser light beam on scan mirror 31.

Now, the configuration of transfer optical system 17 will be described in further detail.

Figure 11:
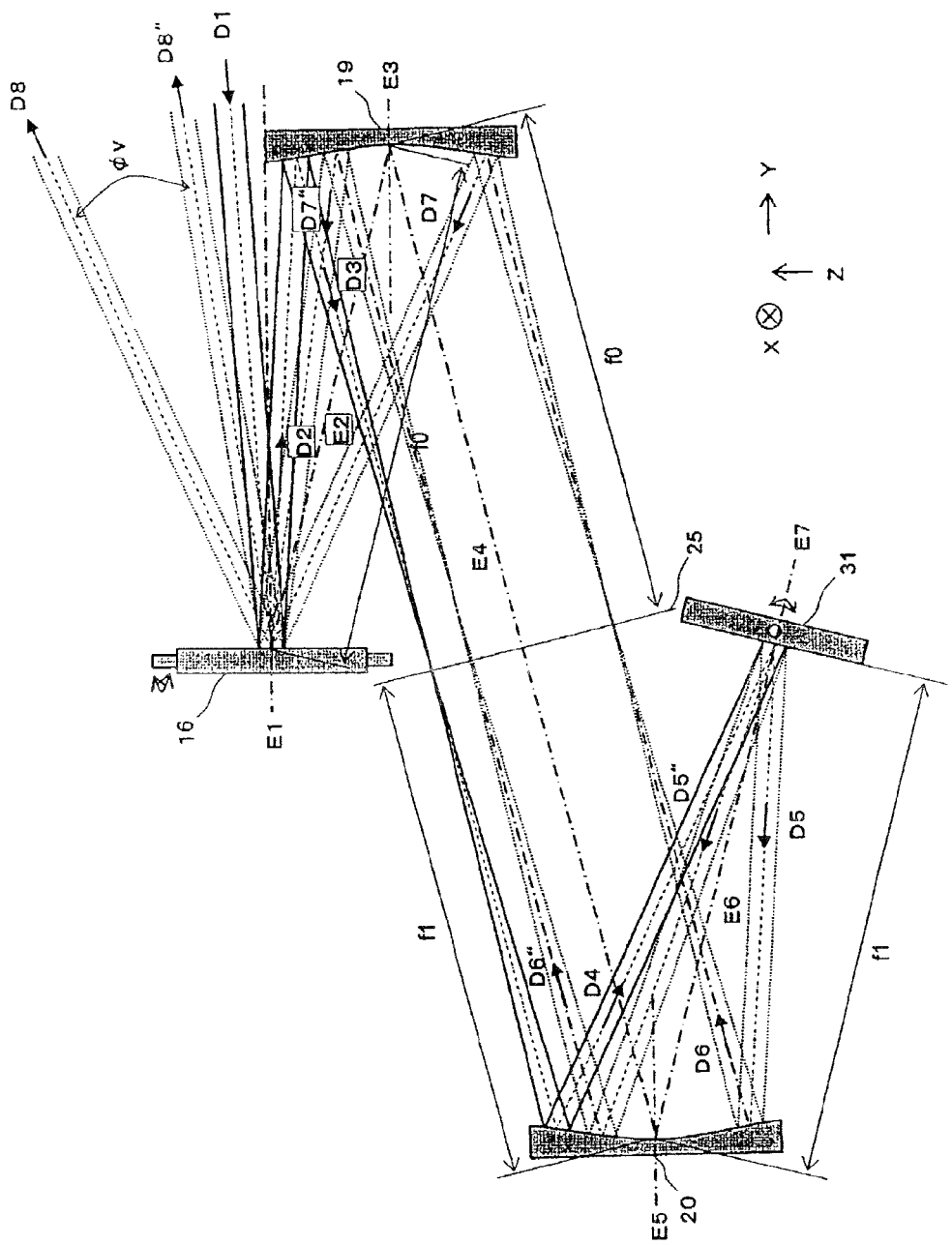
FIG. 11 is a diagram of the configuration of the transfer optical system according to the second exemplary embodiment as viewed in the X direction.
Figure 12:
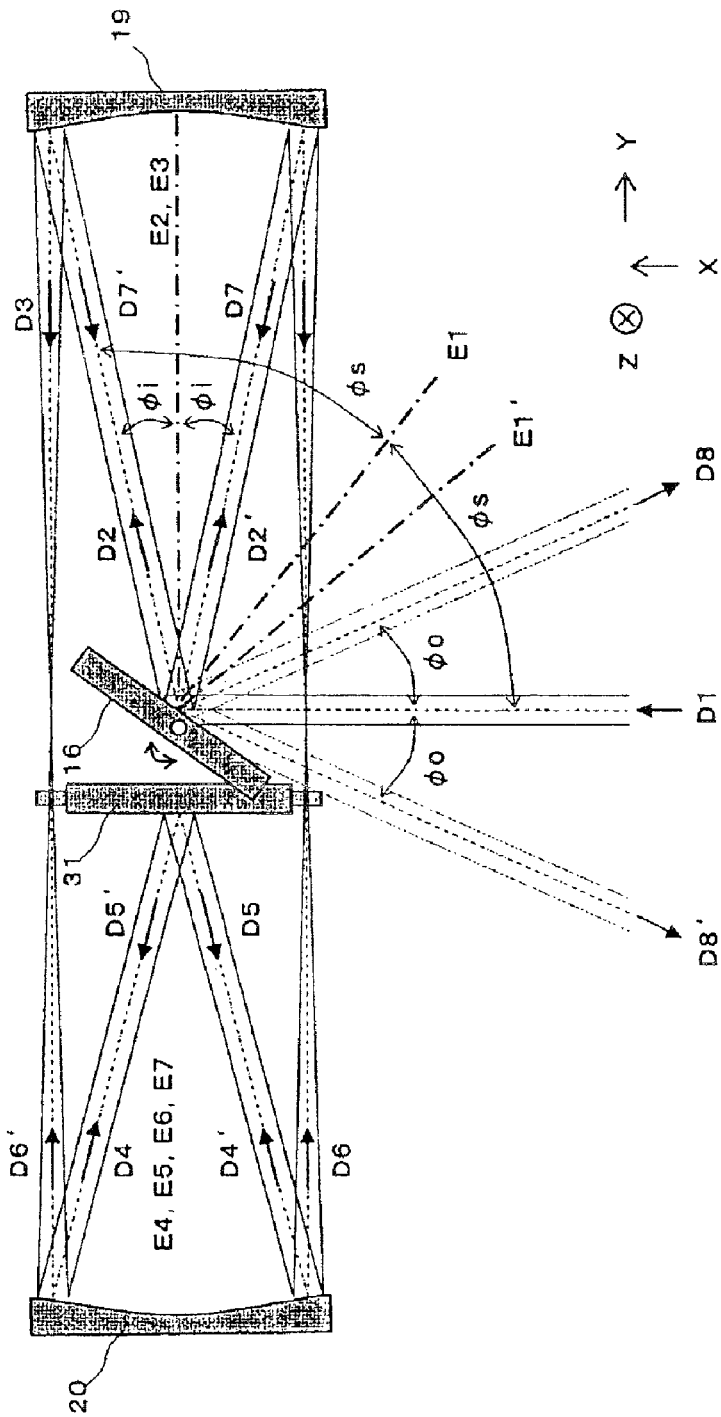
FIG. 12 is a diagram of the configuration of the transfer optical system according to the second exemplary embodiment as viewed in the Z direction.

FIG. 11 is a diagram of transfer optical system 17 as viewed in the X direction. Furthermore, FIG. 12 is a diagram of transfer optical system 17 as viewed in the Z direction.

Scan mirror 31 is provided at the position of reflection mirror 21 shown in FIG. 4 and FIG. 5. Thus, the position of incidence of a laser light beam on scan mirror 16 and the position of incidence of a laser light beam on scan mirror 31 are conjugate with respect to an optical system with concave mirrors 19 and 20.

Furthermore, scan mirror 31 rotates reciprocatingly around a second axis of rotation to scan a laser light beam received from concave mirror 20 in a second scanning direction (Z direction). The laser light beam thus enters concave mirror 20.

(Description of Operation)

Now, the operation of the transfer optical system will be described.

Light beam D3 is reflected by concave mirror 20, and resultant light beam D4 enters scan mirror 31. Light beam D4 is scanned by scan mirror 31 and enters concave mirror 20.

Laser light beams resulting from scanning of reflected light beam D4 at maximum scan angles ±φv by scan mirror 31 are defined as D5 and D5", respectively.

Light beams D5 and D5" are reflected by concave mirror 20, and resultant respective light beams D6 and D6" are focused on focal plane 22 so as to have the minimum diameter. Thereafter, light beams D6 and D6" enter concave mirror 19.

Light beams D6 and D6" are reflected by concave mirror 19, and resultant respective light beams D7 and D7" enter scan mirror 16. Then, light beams D7 and D7" are collimated, by concave mirror 19, into parallel light with the same diameter as that of light beam D1.

Then, light beams D7 and D7" are reflected by scan mirror 16, and resultant respective light beams D8 and D8" are emitted to screen 101.

In this case, the angle 2φv between light beams D8 and D8" corresponds to the scan angle in the second scanning direction.

(Description of Effects)

In the related art, scanning in two different directions requires that a second scan mirror configured to scan a laser light beam scanned by scan mirror 16, in the second scanning direction be longer, in the Y direction, at least than a scan line provided by scan mirror 16. Thus, the second scan mirror is normally larger than scan mirror 16.

In the exemplary embodiment, scan mirror 31 reflects the laser light beam received from concave mirror 20, in the second scanning direction so that the laser light beam enters concave mirror 19. Furthermore, the position of incidence of the laser light beam on scan mirror 16 is conjugate to the position of incidence of the laser light beam on scan mirror 31.

In this case, scan mirror 31 can reflect the incident laser light beam at a particular position to scan the laser light beam in the second scanning direction. Thus, scan mirror 31 can be miniaturized. For example, the size of scan mirror 31 can be made the same as that of scan mirror 16.

Third Exemplary Embodiment

Figure 13:
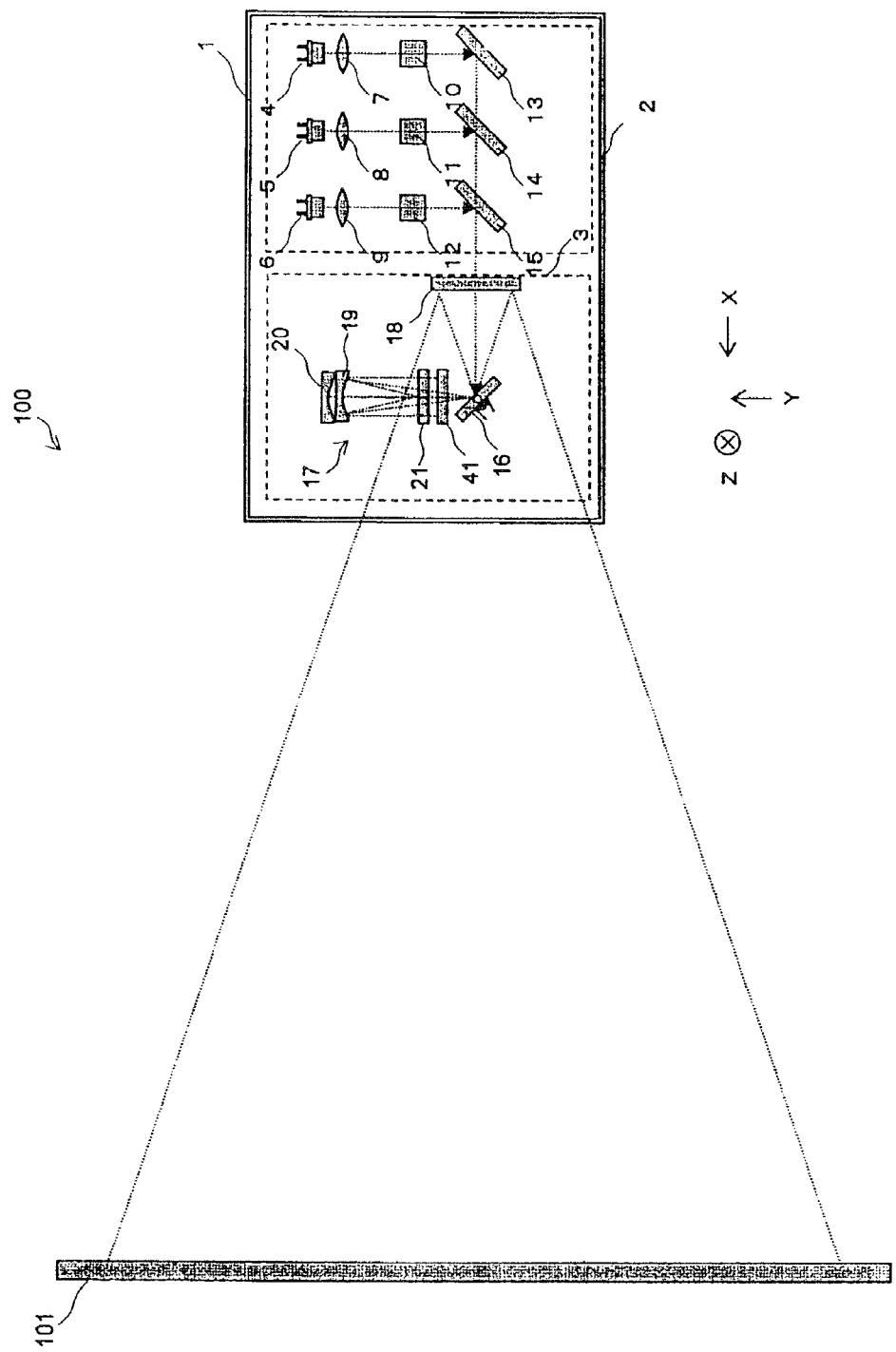
FIG. 13 is a diagram showing the configuration of a display system according to a third exemplary embodiment.

FIG. 13 is a diagram showing the configuration of a display system according to a third exemplary embodiment of the present invention.

In FIG. 13, optical scanning device 3 includes scan mirror 16, transfer optical system 17, and scan mirror 18.

Figure 14:
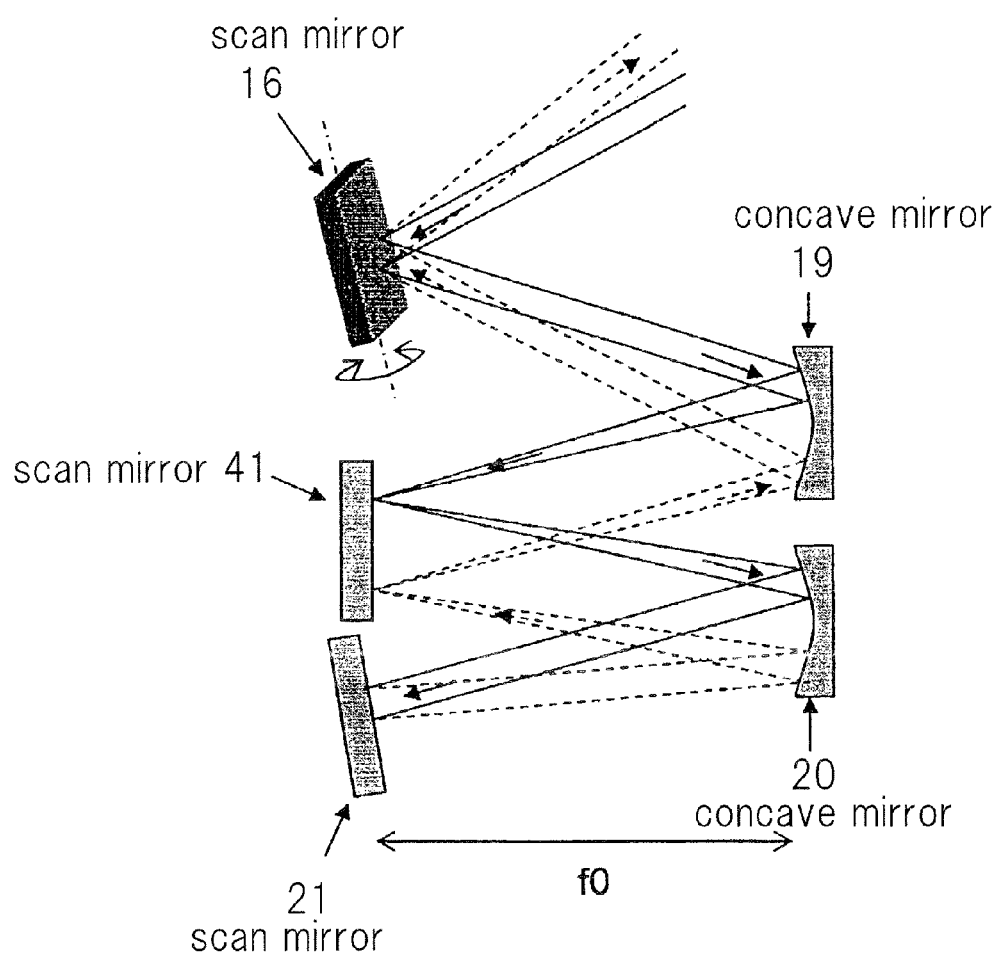
FIG. 14 is a schematic diagram showing the configuration of a transfer optical system according to the third exemplary embodiment.

FIG. 14 is a schematic diagram showing the configuration of transfer optical system 17 according to the exemplary embodiment. In FIG. 14, a plurality of mirrors of transfer optical system 17 include concave mirrors 19 and 20 and reflection mirrors 21 and 41.

Reflection mirror 41 is located on the optical path between concave mirrors 19 and 20. Reflection mirror 41 is an example of a second reflection mirror.

Here, concave mirrors 19 and 20 have an equal focal distance. At this time, reflection mirror 41 is located at the focal distance of concave mirror 19 from concave mirror 19 along the optical path between concave mirrors 19 and 20.

Concave mirror 19 allows a laser light beam scanned by scan mirror 16 to enter concave mirror 20 via reflection mirror 41. Furthermore, concave mirror 20 allows a laser light beam received from reflection mirror 21 to enter concave mirror 19 via reflection mirror 41.

Now, the configuration of transfer optical system 17 will be described in detail.

Figure 15:
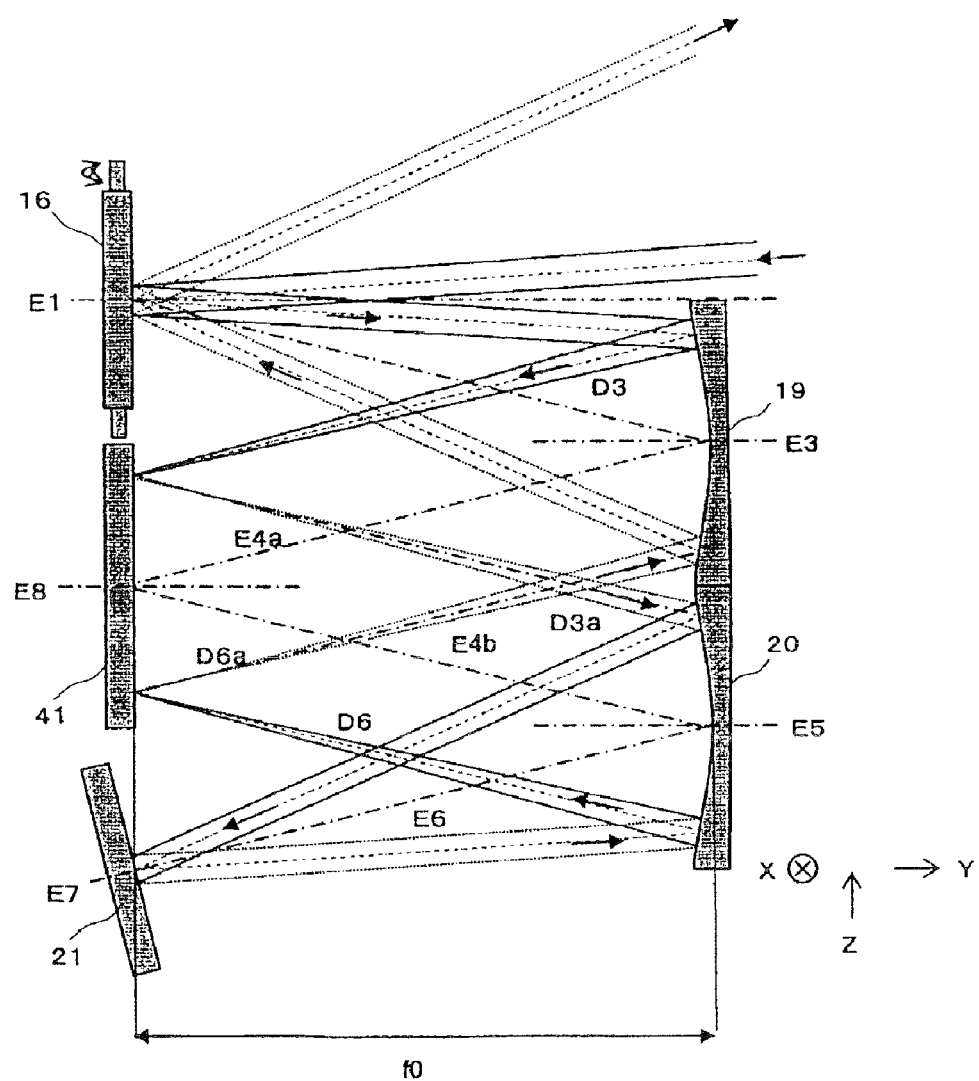
FIG. 15 is a diagram of the configuration of the transfer optical system according to the third exemplary embodiment as viewed in the X direction.
Figure 16:
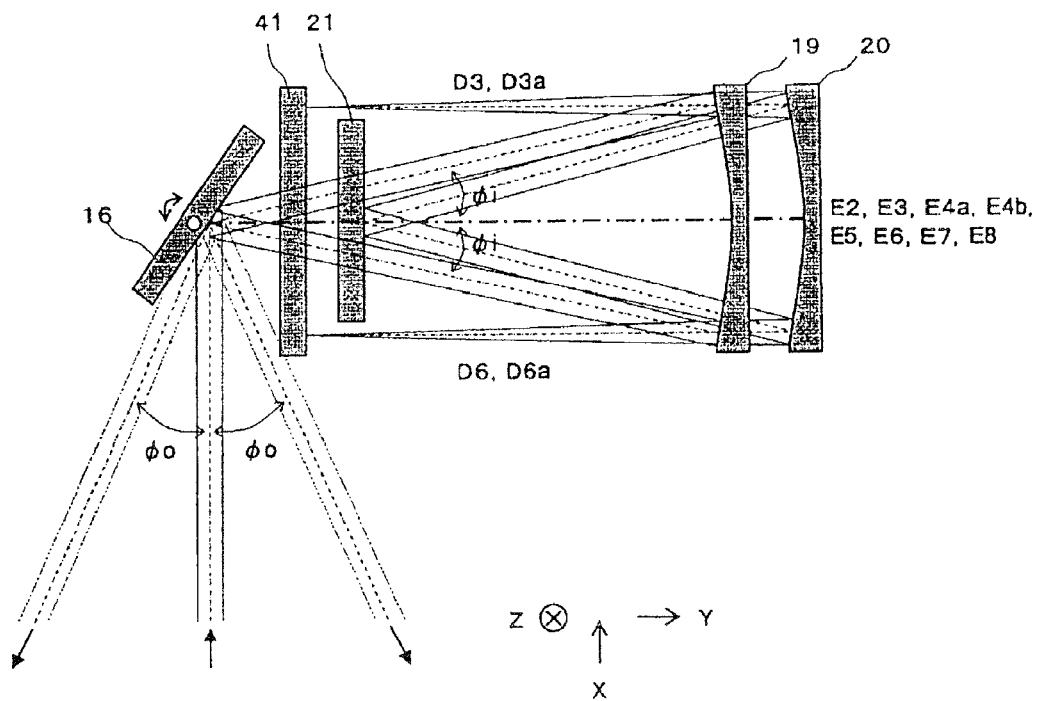
FIG. 16 is a diagram of the configuration of the transfer optical system according to the third exemplary embodiment as viewed in the Z direction.

FIG. 15 is a diagram of transfer optical system 17 as viewed in the X direction. Furthermore, FIG. 16 is a diagram of transfer optical system 17 as viewed in the Z direction.

First, the configuration of transfer optical system 17 as viewed in the X direction will be described with reference to FIG. 15.

The angle between the normal E3 of concave mirror 19 and line E4a joining the center of concave mirror 19 with the center of reflection mirror 41 is $(\theta o - \theta i)/2$. Furthermore, the distance between the center of concave mirror 19 and the center of reflection mirror 41 is f0. Moreover, the angle between normal E8 of reflection mirror 41 and line E4a joining the center of concave mirror 19 with the center of reflection mirror 41 is $(\theta o - \theta i)/2$.

Furthermore, the angle between normal E5 of concave mirror 20 and line E4b joining the center of concave mirror 20 with the center of reflection mirror 41 is $(\theta o - \theta i)/2$. Additionally, the distance between the center of concave mirror 20 and the center of reflection mirror 41 is f0.

Now, the configuration of transfer optical system 17 as viewed in the Z direction will be described with reference to FIG. 16. FIG. 16 shows concave mirror 20 and reflection mirrors 21 and 41 for convenience. However, in actuality, reflection mirrors 21 and 41 overlap scan mirror 16. Concave mirror 20 overlaps concave mirror 19.

The angle between normal E3 of concave mirror 19 and line E4a joining the center of concave mirror 19 with the center of reflection mirror 41 is zero degree. Furthermore, the angle between normal E8 of reflection mirror 41 and line E4a joining the center of concave mirror 19 with the center of reflection mirror 41 is zero degree. Moreover, the angle between normal E5 of concave mirror 20 and line E4b joining the center of concave mirror 20 with the center of reflection mirror 41 is zero degree.

In the exemplary embodiment, concave mirrors 19 and 20 have an equal focal distance and are thus lie in line in the Z direction. Thus, concave mirrors 19 and 20 can be integrated together.

Figure 17:
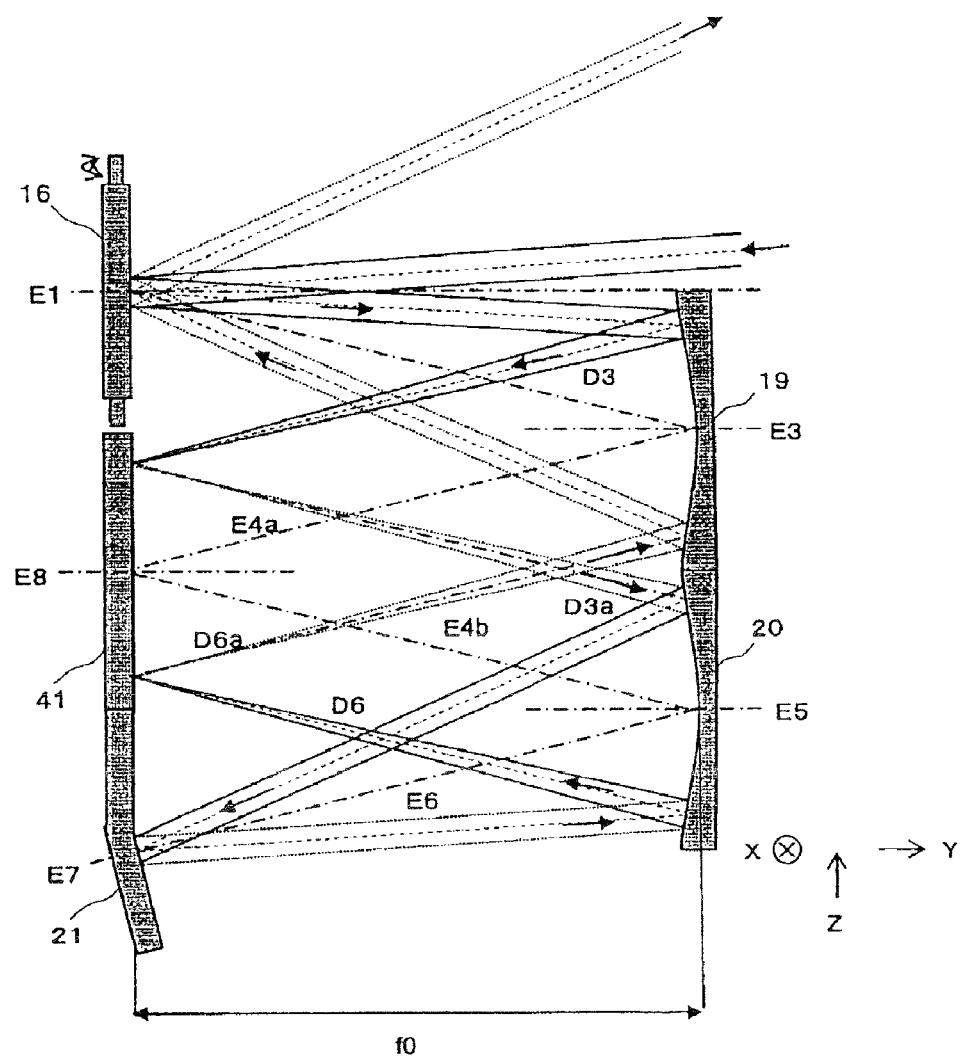
FIG. 17 is a diagram showing the configuration of a transfer optical system integrated with a reflection mirror.

Furthermore, in FIG. 16, reflection mirrors 21 and 41 are separated from each other but can in actuality be integrated together. FIG. 17 is a diagram showing the configuration of transfer optical system 17 in which reflection mirrors 21 and 41 are integrated together.

In FIG. 17, reflection mirror 21 is integrated with reflection mirror 41. Furthermore, reflection mirror 21 has an elevation angle in the YZ plane in order to reflect a laser light beam received from concave mirror 20 so that the laser light beam enters concave mirror 20.

(Description of Operation)

Now, the operation of transfer optical system 17 will be described.

First, the operation of transfer optical system 17 as viewed in the X direction will be described with reference to FIG. 15.

Light beam D2 is reflected by concave mirror 19, and resultant light beam D3 enters reflection mirror 41 at angle $(\theta o - \theta i)/2$ to normal E8 of reflection mirror 41. Light beam D3 is focused at the position of incidence on reflection mirror 41 so as to have the minimum diameter.

Light beam D3 is reflected by reflection mirror 41, and resultant light beam D3a enters concave mirror 20 at angle $(\theta o - \theta i)/2$ to normal E5 of concave mirror 20.

Furthermore, light beam D5 is reflected by concave mirror 20, and resultant light beam D6 enters reflection mirror 41 at angle (θo−θi)/2 to normal E8 of reflection mirror 41. Light beam D5 is focused at the position of incidence on reflection mirror 41 so as to have the minimum diameter.

Light beam D6 is reflected by reflection mirror 41, and resultant light beam D6a enters concave mirror 19 at angle (θo−θi)/2 to normal E3 of concave mirror 19.

Now, the operation of transfer optical system 17 as viewed in the Z direction will be described with reference to FIG. 16.

Light beam D2 is reflected by concave mirror 19, and resultant light beam D3 enters concave mirror 20 at zero degree to normal E8 of reflection mirror 41. Light beam D3 is focused at the position of incidence on the reflection mirror so as to have the minimum diameter.

Light beam D3 is reflected by reflection mirror 41, and resultant light beam D3a enters concave mirror 20 at zero degree to normal E5 of concave mirror 20.

Furthermore, light beam D5 is reflected by concave mirror 20, and resultant light beam D6 enters reflection mirror 41 at zero degree to the normal of reflection mirror 41. Light beam D6 is focused at the position of incidence on the reflection mirror so as to have the minimum diameter.

Light beam D6 is reflected by reflection mirror 41, and resultant light beam D6a enters concave mirror 19 at zero degree to normal E3 of concave mirror 19.

(Description of Effects)

In the exemplary embodiment, reflection mirror 41 is located on the optical path between concave mirrors 19 and 20.

In this case, the laser light beam traveling between concave mirrors 19 and 20 can be folded back by reflection mirror 41. This enables optical scanning device 3 to be further miniaturized.

For example, when reflection mirror 41 can be provided at the position of focal distance f0 along the optical path from concave mirror 19, the length of the optical scanning device in the Y direction can be set equal to or smaller than one, that is the longer of focal distance f0 of concave mirror 19 and focal distance f1 of concave mirror 20.

Furthermore, in the exemplary embodiment, concave mirrors 19 and 20 have equal focal distance.

In this case, concave mirrors 19 and 20 lie in line in the Z direction. Furthermore, reflection mirrors 21 and 41 lie in line in the Z direction. Hence, concave mirrors 19 and 20 can be integrated together. Furthermore, reflection mirrors 21 and 41 can be integrated together. This enables the device configuration to be simplified, allowing, for example, simple adjustment of optical scanning device 3.

Fourth Exemplary Embodiment

Figure 18:
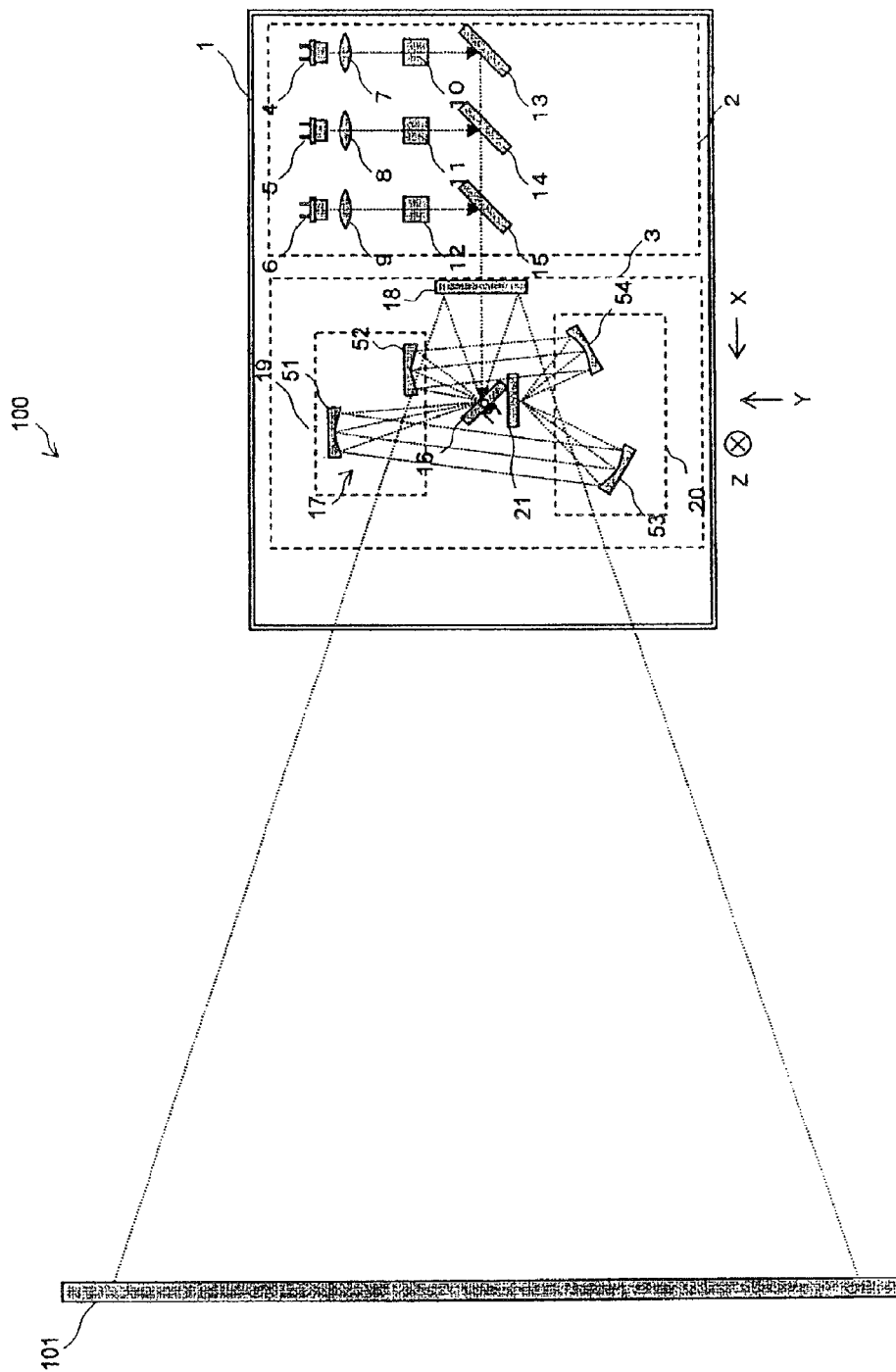
FIG. 18 is a diagram showing the configuration of a display system according to a fourth exemplary embodiment.

FIG. 18 is a diagram showing the configuration of a display system according to a fourth exemplary embodiment of the present invention.

In FIG. 18, optical scanning device 3 includes scan mirror 16, transfer optical system 17, and scan mirror 18.

Figure 19:
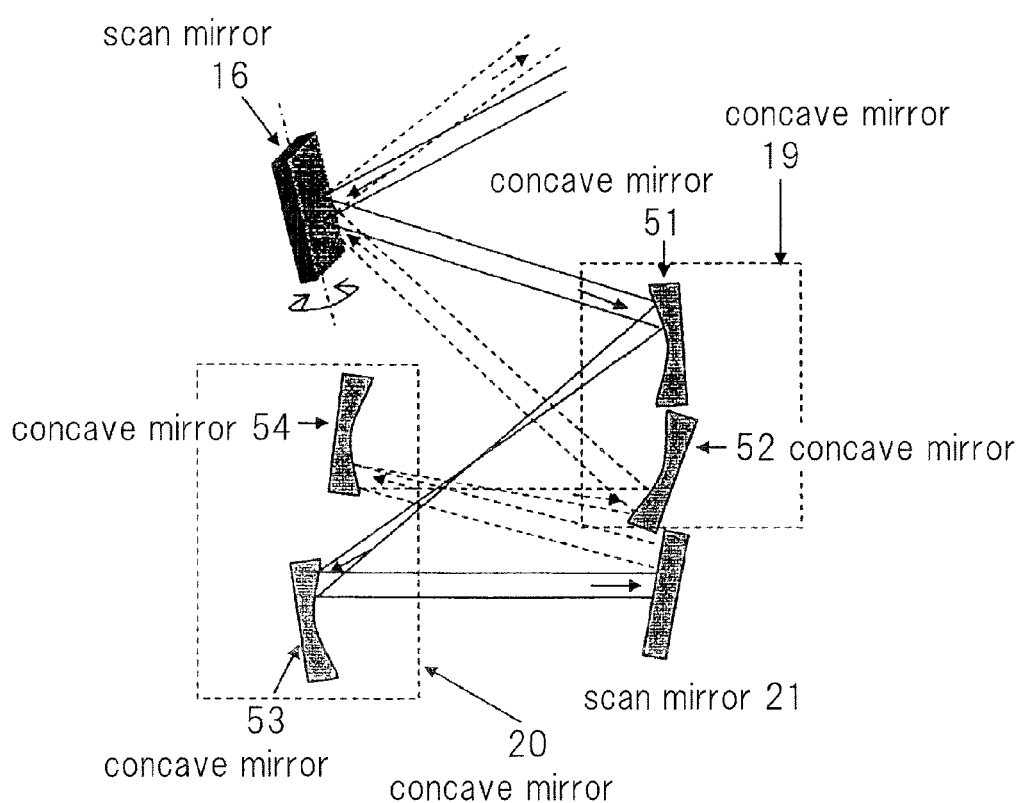
FIG. 19 is a schematic diagram showing the configuration of a transfer optical system according to the fourth exemplary embodiment.

FIG. 19 is a schematic diagram showing the configuration of transfer optical system 17 according to the exemplary embodiment.

In FIG. 19, a plurality of mirrors of transfer optical system 17 include concave mirrors 19 and 20 and reflection mirror 21. Furthermore, concave mirror 19 includes concave mirrors 51 and 52. Concave mirror 20 includes concave mirrors 53 and 54.

Concave mirror 51 is an example of a third concave mirror. Concave mirror 52 is an example of a fourth concave mirror. Concave mirror 53 is an example of a fifth concave mirror. Concave mirror 54 is an example of a sixth concave mirror.

Concave mirror 51 reflects a laser light beam scanned by scan mirror 16 so that the laser light beam enters concave mirror 53. Concave mirror 52 reflects a laser light beam received from concave mirror 54 so that the laser light beam enters scan mirror 16.

Concave mirror 53 reflects a laser light beam received from concave mirror 51 so that the laser light beam enters reflection mirror 21. Concave mirror 54 reflects a laser light beam received from reflection mirror 21 so that the laser light beam enters concave mirror 52.

Reflection mirror 21 allows a laser light beam received from concave mirror 53 to enter concave mirror 54.

Now, the configuration of transfer optical system 17 will be described in detail.

Figure 20:
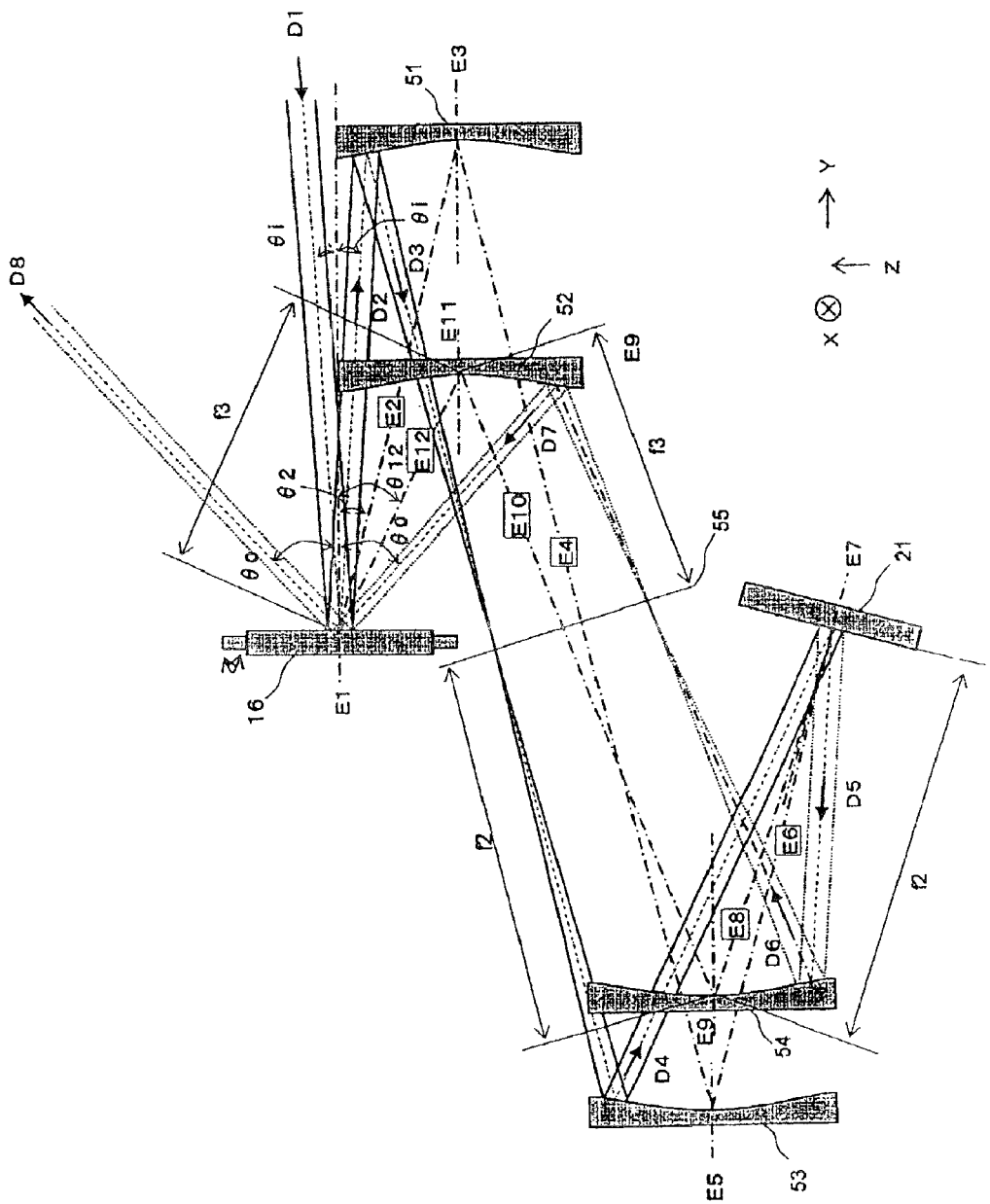
FIG. 20 is a diagram of the configuration of the transfer optical system according to the fourth exemplary embodiment as viewed in the X direction.
Figure 21:
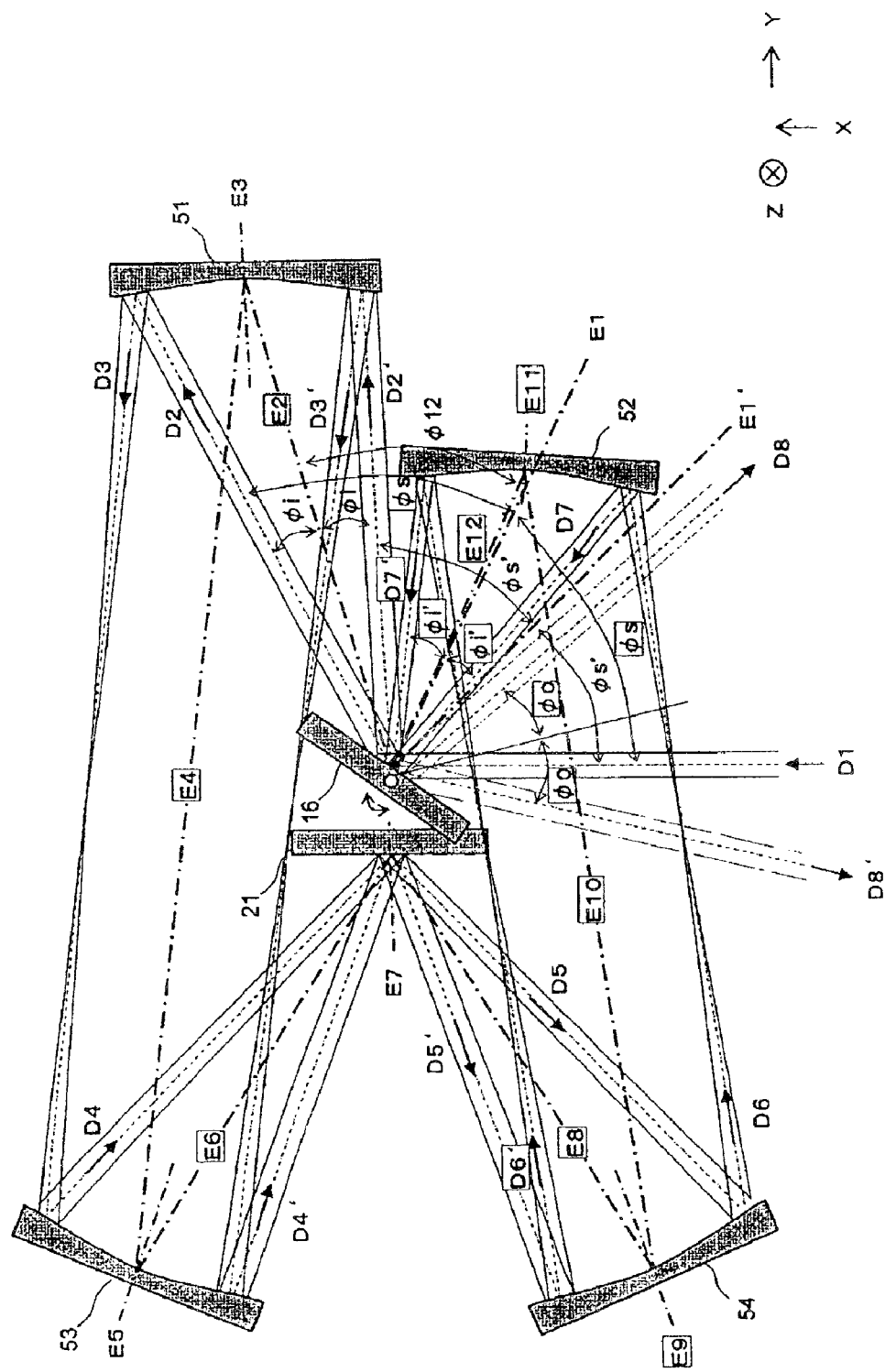
FIG. 21 is a diagram of the configuration of the transfer optical system according to the fourth exemplary embodiment as viewed in the Z direction.

FIG. 20 is a diagram of transfer optical system 17 as viewed in the X direction. Furthermore, FIG. 21 is a diagram of transfer optical system 17 as viewed in the Z direction.

First, the configuration of transfer optical system 17 as viewed in the X direction will be described with reference to FIG. 20.

Here, the focal distance of concave mirror 51 is defined as f0. The focal distance of concave mirror 52 is defined as f3. The focal distance of concave mirror 53 is defined as f1. The focal distance of concave mirror 54 is defined as f2.

As is the case of the first exemplary embodiment, the angle between normal E1 of scan mirror 16 and incident light beam D1 on scan mirror 16 is defined as θi. Furthermore, the angle between normal E1 of scan mirror 16 and exit light beam D8 from scan mirror 16 is defined as θo.

Additionally, the angle between normal E1 of scan mirror 16 and line E2 joining the center of scan mirror 16 with the center of concave mirror 51 is defined as θ2. Moreover, the angle between normal E1 of scan mirror 16 and line E12 joining the center of scan mirror 16 with the center of concave mirror 52 is defined as θ12.

The angle between normal E3 of concave mirror 51 and line E2 joining the center of scan mirror 16 with the center of concave mirror 51 is defined as θ2. The angle between normal E9 of concave mirror 54 and line E10 joining the center of concave mirror 54 with the center of concave mirror 52 is defined as θ12.

The distance between the center of scan mirror 16 and the center of concave mirror 51 is f0.

Furthermore, the angle between normal E3 of concave mirror 51 and line E4 joining the center of concave mirror 51 with the center of concave mirror 53 is defined as θ2. Additionally, the distance between the center of concave mirror 51 and the center of concave mirror 53 is (f0+f1). In addition, the angle between normal E5 of concave mirror 53 and line E4 joining the center of concave mirror 51 with the center of concave mirror 53 is defined as θ2.

The angle between normal E5 of concave mirror 53 and line E6 joining the center of concave mirror 53 with the center of reflection mirror 21 is defined as θ2. Additionally, the distance between the center of concave mirror 53 and the center of reflection mirror 21 is f1.

Normal E7 of reflection mirror 21 is the bisector of the angle between line E6 joining the center of concave mirror 53 with the center of reflection mirror 21 and line E8 joining the center of reflection mirror 21 with the center of concave mirror 54. Furthermore, the distance between the center of reflection mirror 21 and the center of concave mirror 54 is f2.

The distance between the center of concave mirror 52 and the center of concave mirror 54 is (f2+f3).

The angle between normal E11 of concave mirror 52 and line E12 joining the center of concave mirror 52 with the center of scan mirror 16 is θ12. Additionally, the distance between the center of concave mirror 52 and the center of scan mirror 16 is f3.

Now, the configuration of transfer optical system 17 as viewed in the Z direction will be described with reference to FIG. 21.

The angle between the center line between light beams D2 and D2' and line E2 joining the center of scan mirror 16 with the center of concave mirror 51 is zero degree.

Normal E3 of concave mirror 51 is the bisector of the angle between line E2 joining the center of scan mirror 16 with the center of concave mirror 51 and line E4 joining the center of concave mirror 51 with the center of concave mirror 53.

Normal E5 of concave mirror 53 is the bisector of the angle between line E4 joining the center of concave mirror 51 with the center of concave mirror 53 and line E6 joining the center of concave mirror 53 with the center of reflection mirror 21.

Normal E7 of reflection mirror 21 is the bisector of the angle between line E6 joining the center of concave mirror 53 with the center of reflection mirror 21 and line E8 joining the center of reflection mirror 21 with the center of concave mirror 54.

Normal E9 of concave mirror 54 is the bisector of the angle between line E8 joining the center of reflection mirror 21 with the center of concave mirror 54 and line E10 joining the center of concave mirror 54 with the center of concave mirror 52.

Normal E11 of concave mirror 52 is the bisector of the angle between line E10 joining the center of concave mirror 54 with the center of concave mirror 52 and line E12 joining the center of concave mirror 52 with the center of scan mirror 16.

(Description of Operation)

Now, the operation of transfer optical system 17 will be described.

First, the operation of transfer optical system 17 as viewed in the X direction will be described.

Incident light beam D1 enters scan mirror 16 at angle θi to normal E1 of scan mirror 16.

Subsequently, incident light beam D1 is reflected by scan mirror 16, and resultant light beam D2 enters concave mirror 51 at angle θi to normal E3 of concave mirror 51.

Then, light beam D2 is reflected by concave mirror 51, and resultant light beam D3 is focused on focal plane 55 so as to have the minimum diameter. Thereafter, light beam D enters concave mirror 53 at angle θ2 to normal E5 of concave mirror 53. Focal plane 55 is positioned at distance f0 from concave mirror 51 along the optical path between concave mirrors 51 and 53.

Thereafter, light beam D3 is reflected by concave mirror 20, and resultant light beam D4 enters reflection mirror 21. Then, light beam D4 is collimated into parallel light by concave mirror 53.

Furthermore, light beam D4 is reflected by reflection mirror 21, and resultant light beam D5 enters concave mirror 54.

Moreover, light beam D5 is reflected by concave mirror 54, and resultant light beam D6 is focused on focal plane 55 so as to have the minimum diameter. Thereafter, light beam D6 enters concave mirror 52 at angle θ12 to normal E3 of concave mirror 52. Focal plane 55 is positioned at distance f2 from concave mirror 54 along the optical path between concave mirrors 54 and 52.

Subsequently, light beam D6 is reflected by concave mirror 52, and resultant light beam D7 enters scan mirror 16 at angle θo to normal E1 of scan mirror 16. Then, light beam D7 is collimated, by concave mirror 52, into parallel light with a diameter equal to f3/f0 of that of light beam D1.

Then, light beam D7 is reflected by scan mirror 16, and resultant light beam D8 is emitted to scan mirror 18 at angle θo to normal E1 of scan mirror 16.

Now, the operation of transfer optical system 17 as viewed in the Z direction will be described.

Here, as is the case with the first embodiment, normals of scan mirror 16 resulting from the maximum deflection of scan mirror 16 are defined as E1 and E1', respectively. Furthermore, the angle between incident light beam D1 and normal E1 of scan mirror 16 is defined as φs. The angle between incident light beam D1 and normal E1' of scan mirror 16 is defined as φs'.

Furthermore, the angle between line E2 joining the center of scan mirror 16 with the center of concave mirror 51 and line E12 joining the center of concave mirror 52 with the center of scan mirror 16 is defined as φ12. Furthermore, the angle between line E12 joining the center of concave mirror 52 with the center of scan mirror 16 and light beam D7 reflected by concave mirror 52 is defined as φi'. Moreover, the angle between line E12 joining the center of concave mirror 52 with the center of scan mirror 16 and light beam D7' reflected by concave mirror 52 is defined as φi'.

First, the case where scan mirror 16 has normal E1 will be described.

In this case, incident light beam D1 enters scan mirror 16 at angle φs to normal E1 of scan mirror 16.

Subsequently, incident light beam D1 is reflected by scan mirror 16, and resultant light beam D2 enters concave mirror 51 at angle φi to line E2 joining the center of scan mirror 16 with the center of concave mirror 51.

Then, light beam D2 is reflected by concave mirror 51, and resultant light beam D3 is focused on focal plane 55 so as to have the minimum diameter. Thereafter, light beam D3 enters concave mirror 53. Focal plane 55 is positioned at distance f0 from concave mirror 51 along the optical path.

Thereafter, light beam D3 is reflected by concave mirror 53, and resultant light beam D4 enters reflection mirror 21. Then, light beam D4 is collimated into parallel light by concave mirror 53.

Furthermore, light beam D4 is reflected by reflection mirror 21, and resultant light beam D5 enters concave mirror 54.

Moreover, light beam D5 is reflected by concave mirror 54, and resultant light beam D6 is focused on focal plane 55 so as to have the minimum diameter. Thereafter, light beam D6 enters concave mirror 52. Focal plane 55 is positioned at distance f3 from concave mirror 52 along the optical path.

Subsequently, light beam D6 is reflected by concave mirror 52, and resultant light beam D7 enters scan mirror 16 at angle (φ−φi−φ12−φi') to normal E1 of scan mirror 16. Then, light beam D7 is collimated, by concave mirror 52, into parallel light with a diameter equal to f3/f0 of that of light beam D1.

Then, light beam D7 is reflected by scan mirror 16, and resultant light beam D8 is emitted to scan mirror 18 at angle (φs−φi−φ12−φi') to normal E1 of scan mirror 16. Thus, light beam D8 is emitted at angle (φi+φ12+φi') to incident light beam D1.

Now, the case where scan mirror 16 has normal E1' will be described.

In this case, incident light beam D1 enters scan mirror 16 at angle φs' to normal E1' of scan mirror 16.

Subsequently, incident light beam D1 is reflected by scan mirror 16, and resultant light beam D2' enters concave mirror 51 at angle φi to line E2 joining the center of scan mirror 16 with the center of concave mirror 51.

Then, light beam D2' is reflected by concave mirror 51, and resultant light beam D3' is focused on focal plane 55 so as to have the minimum diameter. Thereafter, light beam D3' enters concave mirror 53.

Thereafter, light beam D3' is reflected by concave mirror 53, and resultant light beam D4' enters reflection mirror 21. Then, light beam D4' is collimated into parallel light by concave mirror 53.

Furthermore, light beam D4' is reflected by reflection mirror 21, and resultant light beam D5' enters concave mirror 54.

Moreover, light beam D5' is reflected by concave mirror 53, and resultant light beam D6' is focused on focal plane 55 so as to have the minimum diameter. Thereafter, light beam D6' enters concave mirror 52 at zero degree to normal E3 of concave mirror 52.

Subsequently, light beam D6' is reflected by concave mirror 52, and resultant light beam D7' enters scan mirror 16 at angle ($\phi$s'+$\phi$i−$\phi$12+$\phi$i') to normal E1' of scan mirror 16. Then, light beam D7' is collimated, by concave mirror 52, into parallel light with a diameter equal to f3/f0 of that of light beam D1.

Then, light beam D7' is reflected by scan mirror 16, and resultant light beam D8 is emitted to scan mirror 18 at angle ($\phi$s'+$\phi$i−$\phi$12+$\phi$i') to normal E1 of scan mirror 16.

Thus, light beam D8' is emitted at angle (−$\phi$i+$\phi$12−$\phi$i') to incident light beam D1. Furthermore, as described above, light beam D8 is emitted at angle ($\phi$i+$\phi$22+$\phi$i') to incident light beam D1. Hence, the angle between light beams D8 and D8' is 2($\phi$i+$\phi$i').

In this case, provided that $\phi$i' is larger than $\phi$i, the scan angle of scan mirror 16 can be increased at least to double by transfer optical system 17. Thus, the scan angle of scan mirror 16 can be increased.

For example, if the angles $\phi$i and $\phi$i' are small, $\phi$i' is almost equal to $\phi$i×f0/f3. Thus, F0>f3 enables an increase in the scan angle of scan mirror 16.

In the present embodiment, reflection mirror 41 may be provided on the optical path between concave mirrors 19 and 20. In this case, reflection mirror 41 may be placed either on the optical path between concave mirrors 51 and 53 or on the optical path between concave mirrors 54 and 52.

Furthermore, reflection mirror 21 may be replaced with scan mirror 31. In this case, the laser light beam can be scanned in the second scanning direction by scan mirror 31. Furthermore, provided that the position of incidence of the laser light beam on scan mirror 16 is conjugate to the position of incidence of the laser light beam on scan mirror 31, scan mirror 31 can reflect and scan the incident laser light beam at a particular position. This enables scan mirror 31 to be miniaturized.

(Description of Effects)

According to the exemplary embodiment, concave mirror 51 reflects the laser light beam scanned by scan mirror 16 so that the laser light beam enters concave mirror 53. Concave mirror 52 reflects the laser light beam received from concave mirror 54 so that the laser light beam enters scan mirror 16. Concave mirror 53 reflects the laser light beam received from concave mirror 51 so that the laser light beam enters reflection mirror 21. Concave mirror 54 reflects the laser light beam received from reflection mirror 21 so that the laser light beam enters concave mirror 52. Reflection mirror 21 reflects the laser light beam received from concave mirror 53 so that the laser light beam enters concave mirror 54.

In this case, the scan angle of scan mirror 16 can further be increased by configuring concave mirrors 51 to 54 and reflection mirror 21 as follows: angle $\phi$', to line E12 joining the center of concave mirror 52 with the center of scan mirror 16, of light beam D7' traveling from concave mirror 52 into the scan mirror is larger than angle $\phi$i, to the normal of concave mirror 51, of light beam D2 traveling from scan mirror 16 into concave mirror 51.

Fifth Exemplary Embodiment

Figure 22:
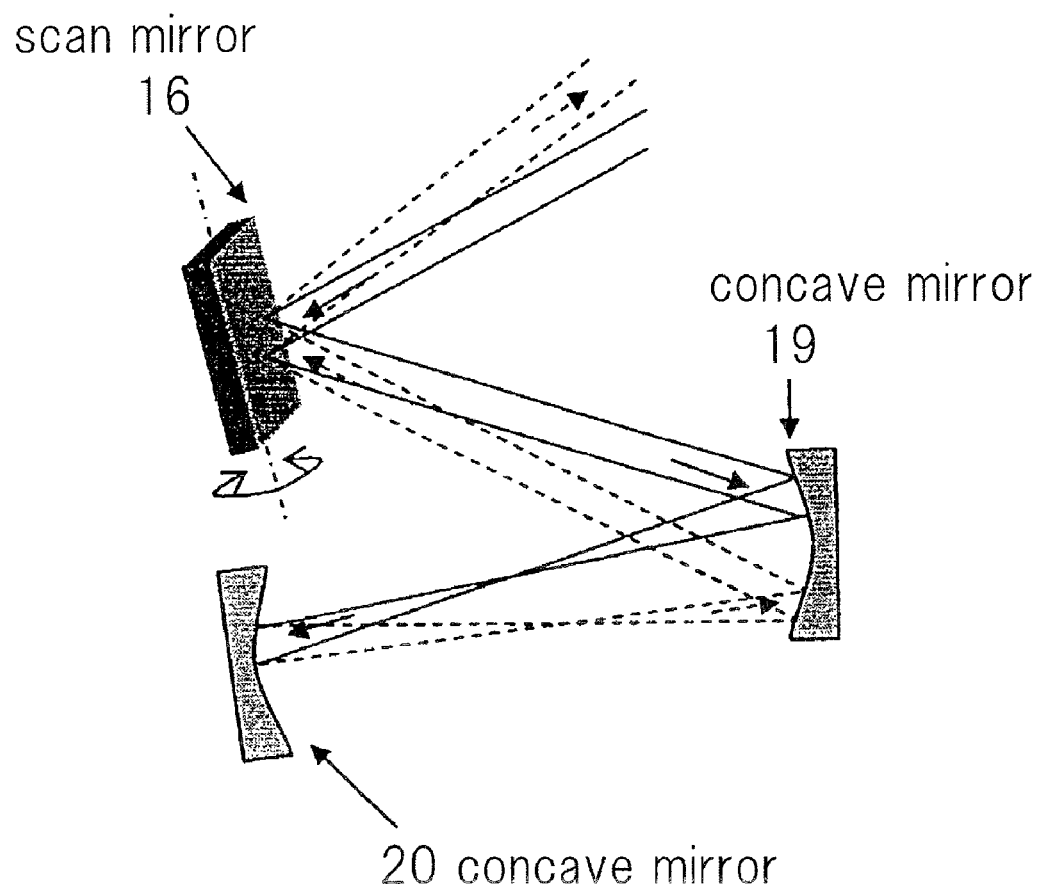
FIG. 22 is a diagram showing the configuration of a display system according to a fifth exemplary embodiment.

FIG. 22 is a diagram showing the configuration of a display system according to a fifth exemplary embodiment of the present invention.

In FIG. 22, optical scanning device 3 includes scan mirror 16 and transfer optical system 17.

Figure 23:
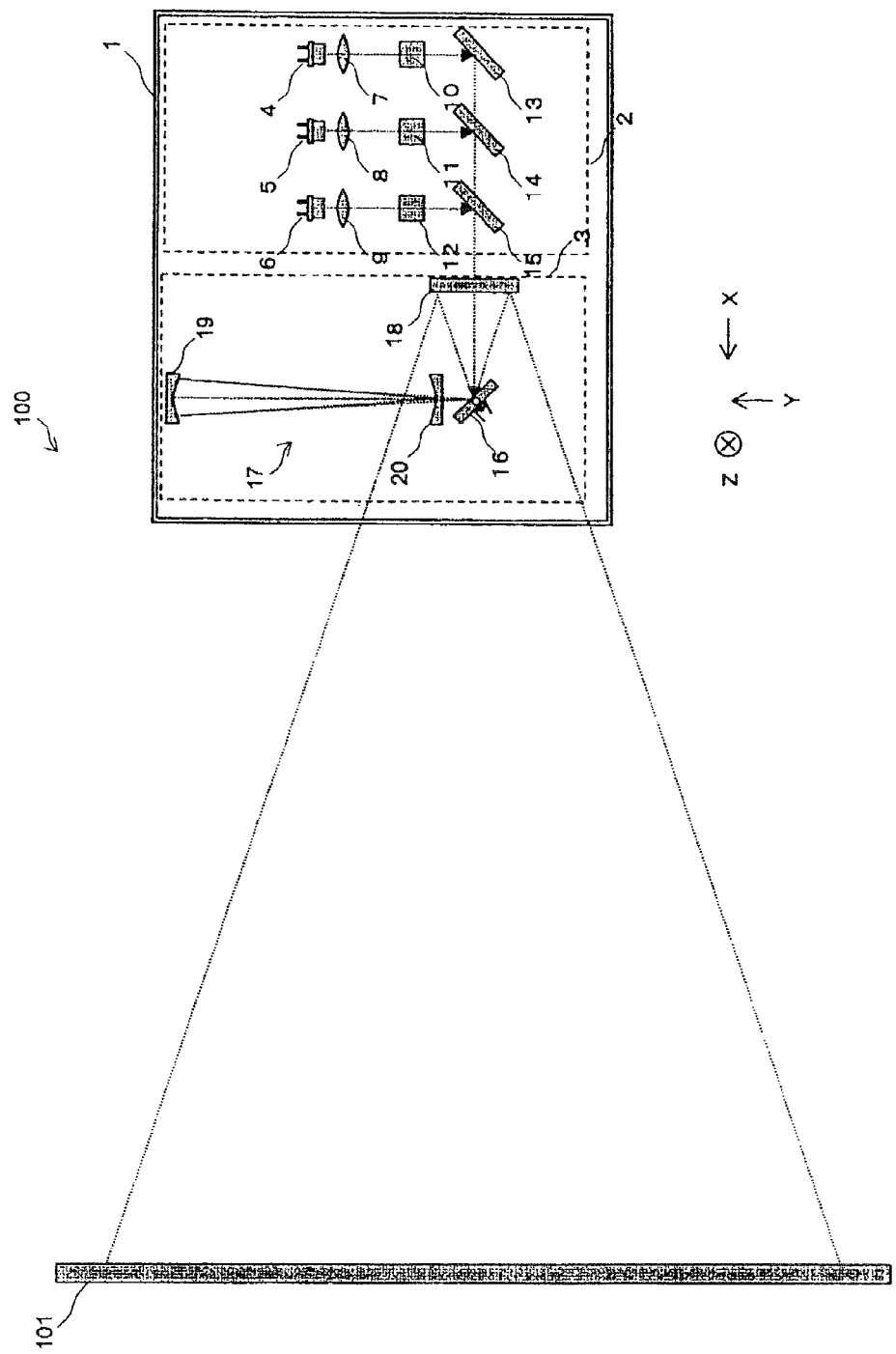
FIG. 23 is a schematic diagram showing the configuration of a transfer optical system according to the fifth exemplary embodiment.

FIG. 23 is a schematic diagram showing the configuration of transfer optical system 17 according to the exemplary embodiment.

In FIG. 23, a plurality of mirrors of transfer optical system 17 include concave mirrors 19 and 20.

Concave mirrors 19 and 20 allow a laser light beam scanned by scan mirror 16 to enter scan mirror 16 via concave mirrors 19 and 20. Furthermore, scan mirror 16 scans and emits the laser light beam received via concave mirrors 19 and 20, to scan mirror 18.

Specifically, concave mirror 19 reflects the laser light beam scanned by scan mirror 16 so that the laser light beam enters concave mirror 20. Furthermore, concave mirror 19 reflects the laser light beam received from concave mirror 20 so that the laser light beam enters scan mirror 16.

Concave mirror 20 reflects the laser light beam received from concave mirror 19 so that the laser light beam enters concave mirror 19.

Furthermore, the position of incidence of the laser light beam on scan mirror 16 and the position of incidence of the laser light beam on concave mirror 20 are conjugate with respect to concave mirror 19.

Now, the configuration of transfer optical system 17 will be described in detail.

Figure 24:
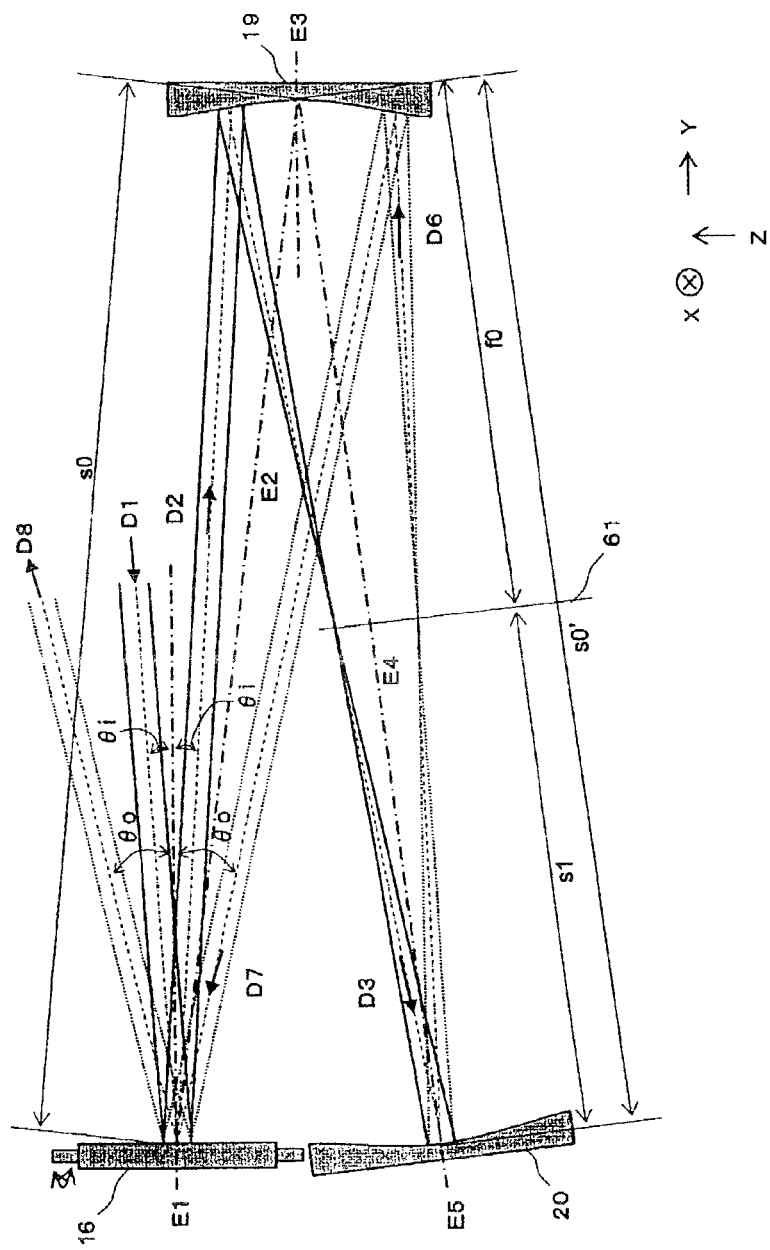
FIG. 24 is a diagram of the configuration of the transfer optical system according to the fifth exemplary embodiment as viewed in the X direction.
Figure 25:
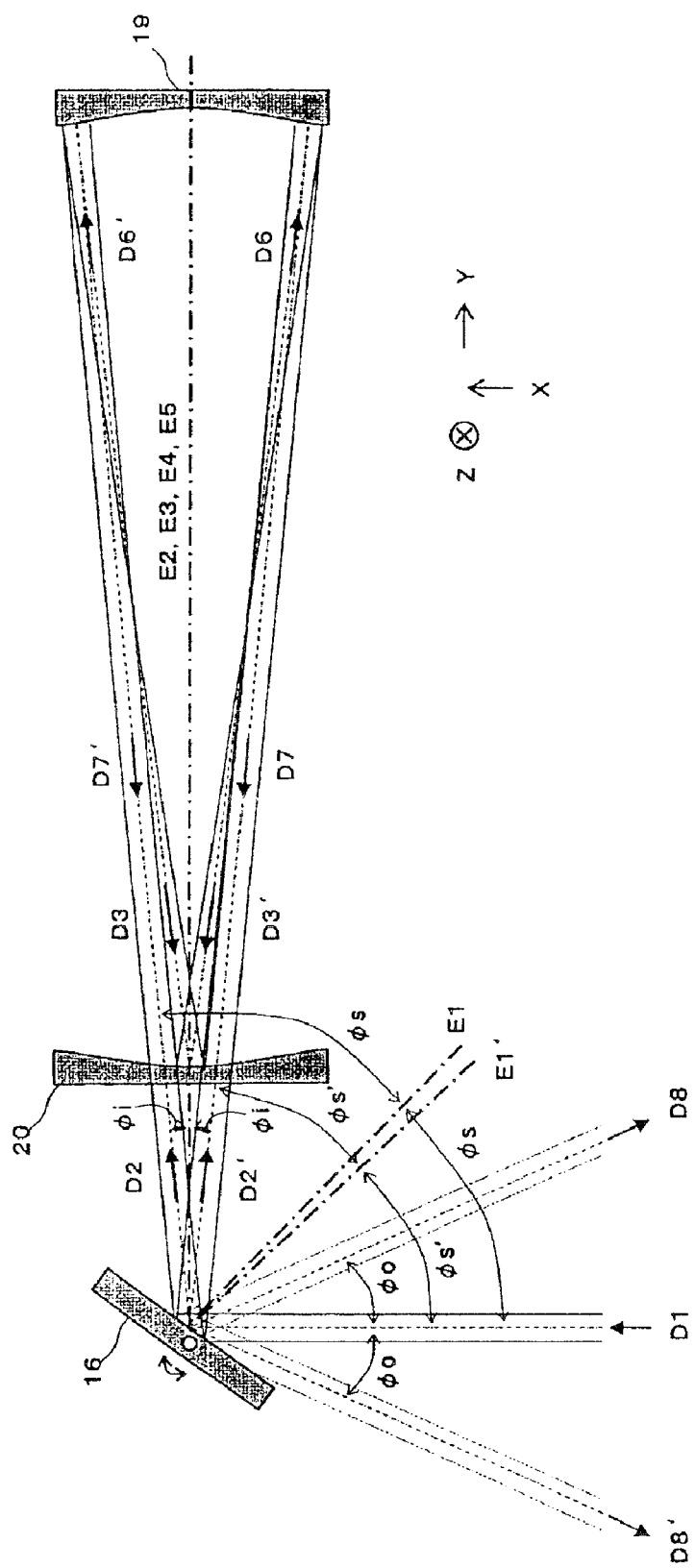
FIG. 25 is a diagram of the configuration of the transfer optical system according to the fifth exemplary embodiment as viewed in the Z direction.

FIG. 24 is a diagram of transfer optical system 17 as viewed in the X direction. Furthermore, FIG. 25 is a diagram of transfer optical system 17 as viewed in the Z direction.

First, the configuration of transfer optical system 17 as viewed in the X direction will be described with reference to FIG. 24.

As is the case with the first exemplary embodiment, the angle between normal E1 of scan mirror 16 and incident light beam D1 entering scan mirror 16 is defined as θi. Furthermore, the angle between normal E1 of scan mirror 16 and exit light beam D8 leaving scan mirror 16 is defined as θo.

Furthermore, the distance between the center of scan mirror 16 and the center of concave mirror 19 is defined as s0. s0 is the double of focal distance f0 of concave mirror 19.

The angle between normal E1 of scan mirror 16 and line E2 joining the center of scan mirror 16 and the center of concave mirror 19 is (θo−θi)/2. Moreover, the angle between normal E3 of concave mirror 19 and line E2 joining the center of scan mirror 16 and the center of concave mirror 19 is (θo−θi)/2.

The angle between normal E5 of concave mirror 20 and line E4 joining the center of concave mirror 19 and the center of concave mirror 20 is zero degree. Furthermore, the distance between the center of concave mirror 19 and the center of concave mirror 20 is (f0+S1). Distance s1 is the distance between concave mirror 20 and focal plane 61 and is the double of focal distance f1 of concave mirror 20.

Now, the configuration of transfer optical system 17 as viewed in the Z direction will be described with reference to FIG. 25.

As is the case with the first exemplary embodiment, reflected light beams resulting from scanning of incident light beam D1 at maximum scan angle ±φi by scan mirror 16 are defined as D2 and D2', respectively.

The angle between line E2 joining the center of scan mirror 16 with the center of concave mirror 19 and the center line between light beams D2 and D2' is zero degree. Furthermore, the angle between the center line, that is between light beams D2 and D2', and concave mirror 19 and normal E3 is zero degree.

Furthermore, the angle between normal E3 of concave mirror 19 and line E4 joining the center of concave mirror 19 with the center of concave mirror 20 is zero degree.

Moreover, the angle between normal E5 of concave mirror 20 and line E4 joining the center of concave mirror 19 with the center of concave mirror 20 is zero degree.

Description of Operation

Now, the operation of transfer optical system 17 will be described.

First, the operation of transfer optical system 17 as viewed in the X direction will be described with reference to FIG. 24.

First, incident light beam D1 enters scan mirror 16 at angle θi to normal E1 of scan mirror 16.

Subsequently, incident light beam D1 is reflected by scan mirror 16, and resultant light beam D2 enters concave mirror 19 at angle θi to normal E3 of concave mirror 19.

Moreover, light beam D2 is reflected by concave mirror 19, and resultant light beam D3 is focused on focal plane 61 so as to have the minimum diameter. Thereafter, light beam D3 enters the center of concave mirror 20. Focal plane 61 is positioned at distance f0 from concave mirror 19 along the optical path between concave mirrors 19 and 20. Positioned at distance f0.

Subsequently, light beam D3 is reflected by concave mirror 20, and resultant light beam D6 is focused on focal plane 61 so as to have the minimum diameter. Thereafter, light beam D6 enters concave mirror 19. Focal plane 61 is positioned at distance s1 along the optical path from concave mirror 20.

Thereafter, light beam D6 is reflected by concave mirror 19, and resultant light beam D7 enters scan mirror 16 at angle θo to normal E1 of scan mirror 16. Then, light beam D7 is collimated, by concave mirror 19, into parallel light with the same diameter as that of light beam D1.

Then, light beam D7 is reflected by scan mirror 16, and resultant light beam D8 is emitted at angle θo to normal of scan mirror 16.

Now, the operation of transfer optical system 17 as viewed in the Z direction will be described with reference to FIG. 25.

As is the case with the first exemplary embodiment, normals of scan mirror 16 resulting from the maximum deflection of scan mirror 16 are defined as E1 and E1'. Normals of scan mirror 16 resulting from the maximum deflection of scan mirror 16 are defined as E1 and E1', respectively. Furthermore, the angle between incident light beam D1 and normal E1 of scan mirror 16 is defined as φs. The angle between incident light beam D1 and normal E1' of scan mirror 16 is defined as φs'.

First, the case where scan mirror 16 has normal E1 will be described.

First, incident light beam D1 enters scan mirror 16 at angle φs to normal E1 of scan mirror 16.

Subsequently, incident light beam D1 is reflected by scan mirror 16, and resultant light beam D2 enters concave mirror 19 at angle φi to normal E3 of concave mirror 19.

Moreover, light beam D2 is reflected by concave mirror 19, and resultant light beam D3 is focused on focal plane 61 so as to have the minimum diameter. Thereafter, light beam D3 enters the center of concave mirror 20.

Thereafter, light beam D3 is reflected by concave mirror 20, and resultant light beam D6 is focused on focal plane 61 so as to have the minimum diameter. Thereafter, light beam D6 enters concave mirror 19.

Subsequently, light beam D6 is reflected by concave mirror 19, and resultant light beam D7 enters scan mirror 16 at angle (φs−2φi) to normal E1 of scan mirror 16. Then, light beam D7 is collimated, by concave mirror 19, into parallel light with the same diameter as that of light beam D1.

Moreover, light beam D7 is reflected by scan mirror 16, and resultant light beam D8 is emitted at angle (φs−2φi) to normal E1 of scan mirror 16. Thus, light beam D8 is emitted at angle 2φi to incident light beam D1.

Now, the case where scan mirror 16 has normal E1' will be described.

First, incident light beam D1' enters scan mirror 16 at angle φs' to normal E1' of scan mirror 16.

Subsequently, incident light beam D1 is reflected by scan mirror 16, and resultant light beam D2' enters concave mirror 19 at angle φi to normal E3 of concave mirror 19.

Moreover, light beam D2' is reflected by concave mirror 19, and resultant light beam D3' is focused on focal plane 61 so as to have the minimum diameter. Thereafter, light beam D3' enters the center of concave mirror 20.

Thereafter, light beam D3' is reflected by concave mirror 20, and resultant light beam D6' is focused on focal plane 61 so as to have the minimum diameter. Thereafter, light beam D6' enters concave mirror 19.

Subsequently, light beam D6' is reflected by concave mirror 19, and resultant light beam D7' enters scan mirror 16 at angle (φs'+2φi) to normal E1 of scan mirror 16. Then, light beam D7 is collimated, by concave mirror 19, into parallel light with the same diameter as that of light beam D1.

Then, light beam D7' is reflected by scan mirror 16, and resultant light beam D8' is emitted at angle (φs'+2φi) to normal E1 of scan mirror 16. Thus, light beam D8' is emitted at angle 2φi to incident light beam D1. Furthermore, as described above, light beam D8' is emitted at angle 2φi to incident light beam D1. Hence, the angle between light beams D8 and D8' is 4φi. Thus, the scan angle of scan mirror 16 can be increased to double by transfer optical system 17.

Description of Effects

According to the exemplary embodiment, concave mirror 19 reflects the laser light beam scanned by scan mirror 16 so that the laser light beam enters concave mirror 20. Concave mirror 19 reflects the laser light beam received from concave mirror 20 so that the laser light beam enters scan mirror 16. Concave mirror 20 reflects the laser light beam received from concave mirror 19 so that the laser light beam enters concave mirror 19.

In this case, the laser light beam scanned by scan mirror 16 is reflected by concave mirror 19 and further by concave mirror 20. The laser light beam reflected by concave mirror 20 enters scan mirror 16 reflected by concave mirror 19.

Thus, the size (the length in the Y direction) of the optical scanning device can be made smaller than the optical path length between concave mirrors 19 and 20. For example, in the exemplary embodiment, the size of the optical scanning device can be set equal to or smaller than (f0+2f1).

Furthermore, the exemplary embodiment eliminates the need for reflection mirror 21, thus enabling the device configuration to be simplified. This enables, for example, simple adjustment of optical scanning device 3.

Sixth Exemplary Embodiment

Figure 26:
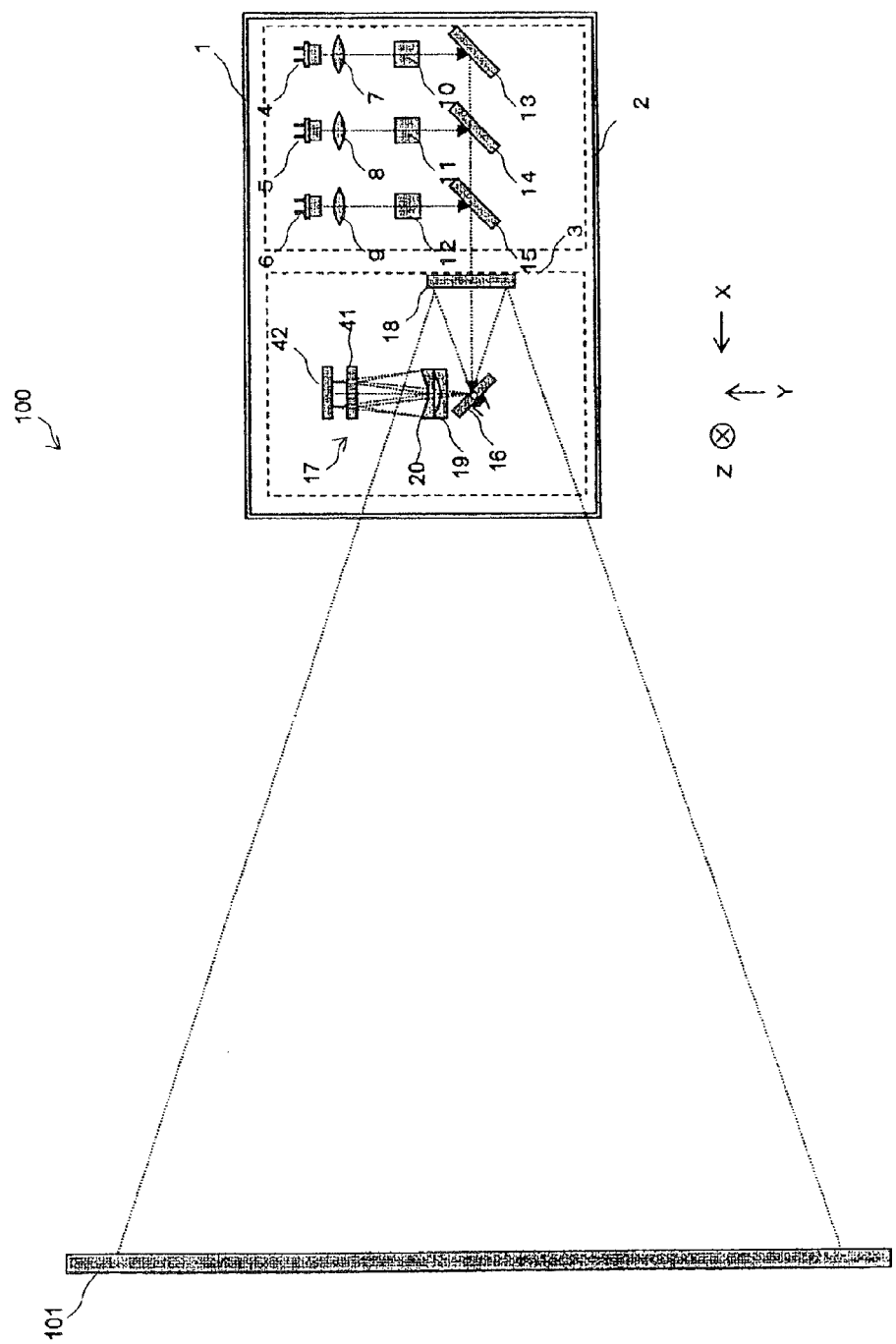
FIG. 26 is a diagram showing the configuration of a display system according to a sixth exemplary embodiment.

FIG. 26 is a diagram showing the configuration of a display system according to a sixth exemplary embodiment.

In FIG. 26, optical scanning device 3 includes scan mirror 16, transfer optical system 17, and scan mirror 18.

Figure 27:
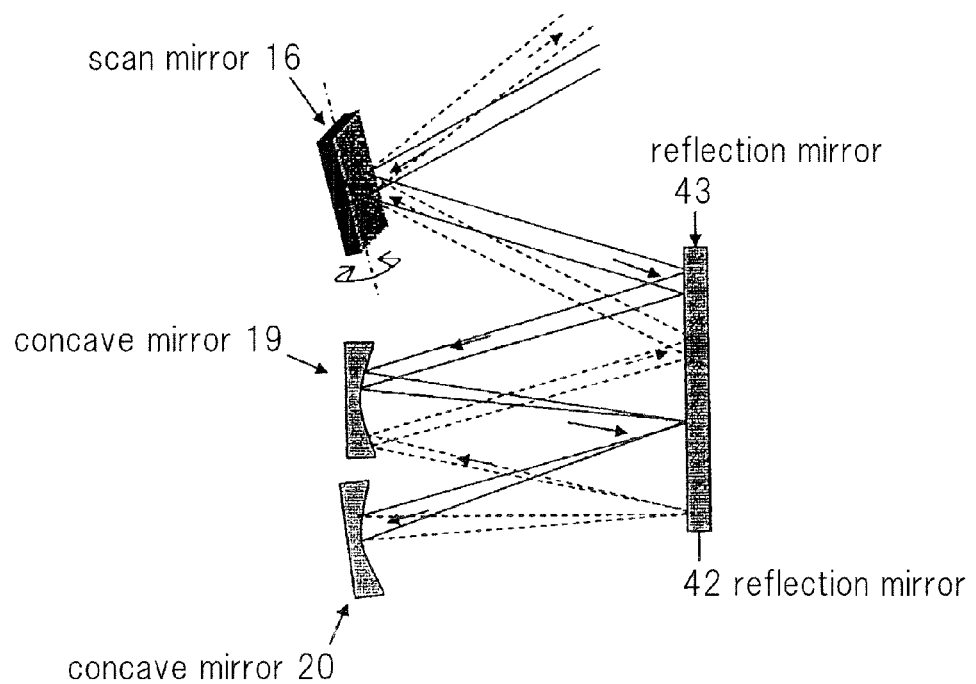
FIG. 27 is a schematic diagram showing the configuration of a transfer optical system according to the sixth exemplary embodiment.

FIG. 27 is a schematic diagram showing the configuration of transfer optical system 17 according to the exemplary embodiment.

In FIG. 27, a plurality of mirrors of transfer optical system 17 include concave mirrors 19 and 20 and reflection mirrors 42 and 43.

Reflection mirror 42 is located on the optical path between concave mirrors 19 and 20. Furthermore, reflection mirror 43 is located on the optical path between scan mirror 16 and concave mirror 19. Reflection mirror 42 is an example of a third reflection mirror. Reflection mirror 43 is an example of a fourth reflection mirror.

Specifically, reflection mirror 42 is located at focal distance f0 of concave mirror 19 along the optical path from concave mirror 19. Furthermore, reflection mirror 43 is located at focal distance f0(s0/2) of concave mirror 19 along the optical path from scan mirror 16.

Reflection mirror 43 reflects a laser light beam scanned by scan mirror 16 so that the laser light beam enters concave mirror 19. Furthermore, reflection mirrors 43 reflects a laser light beam received from concave mirror 19 so that the laser light beam enters scan mirror 16.

Concave mirror 19 allows a laser light beam scanned by reflection mirror 43 to enter concave mirror 20 via reflection mirror 42. Furthermore, concave mirror 20 allows a laser light beam received from reflection mirror 42 to enter concave mirror 19 via reflection mirror 42.

The position of incidence of the laser light beam on scan mirror 16 and the position of incidence of the laser light beam on concave mirror 20 are conjugate with respect to concave mirror 19.

Now, the configuration of transfer optical system 17 will be described in detail.

Figure 28:
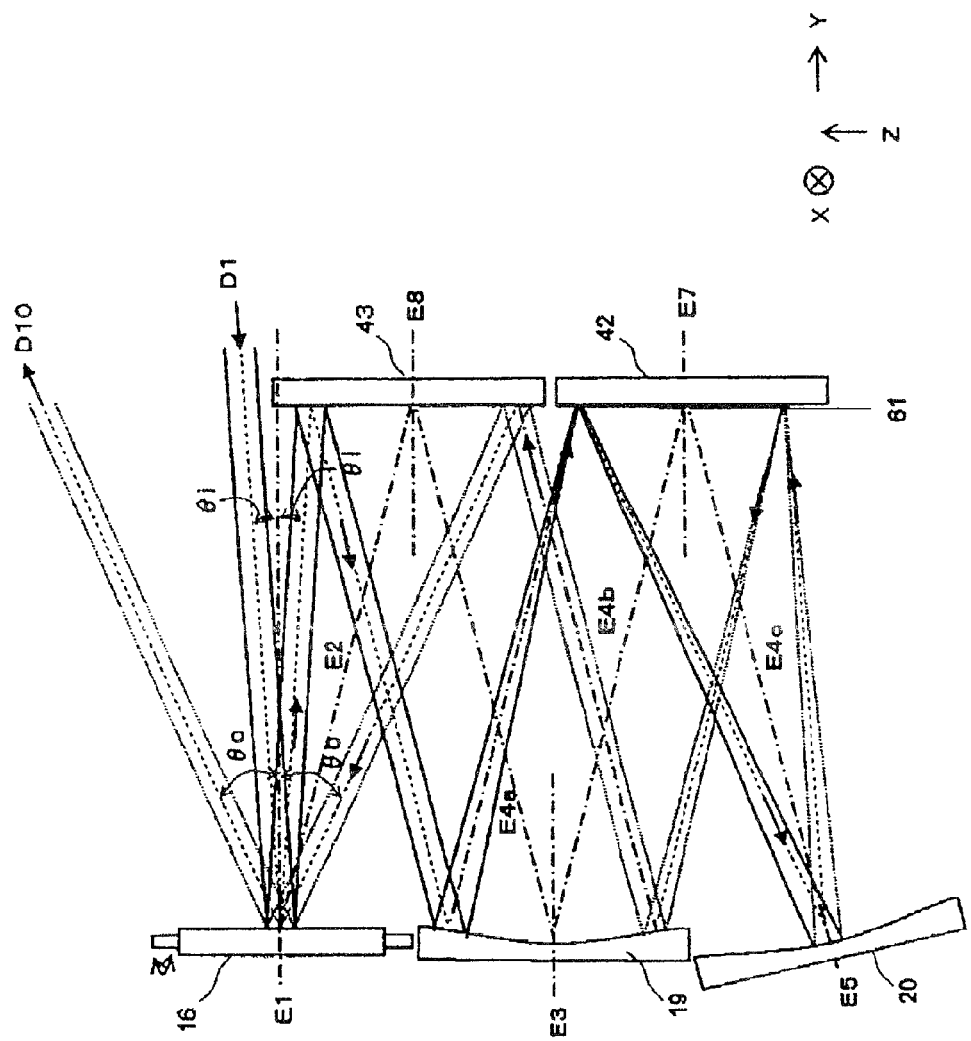
FIG. 28 is a diagram of the configuration of the transfer optical system according to the sixth exemplary embodiment as viewed in the X direction.
Figure 29:
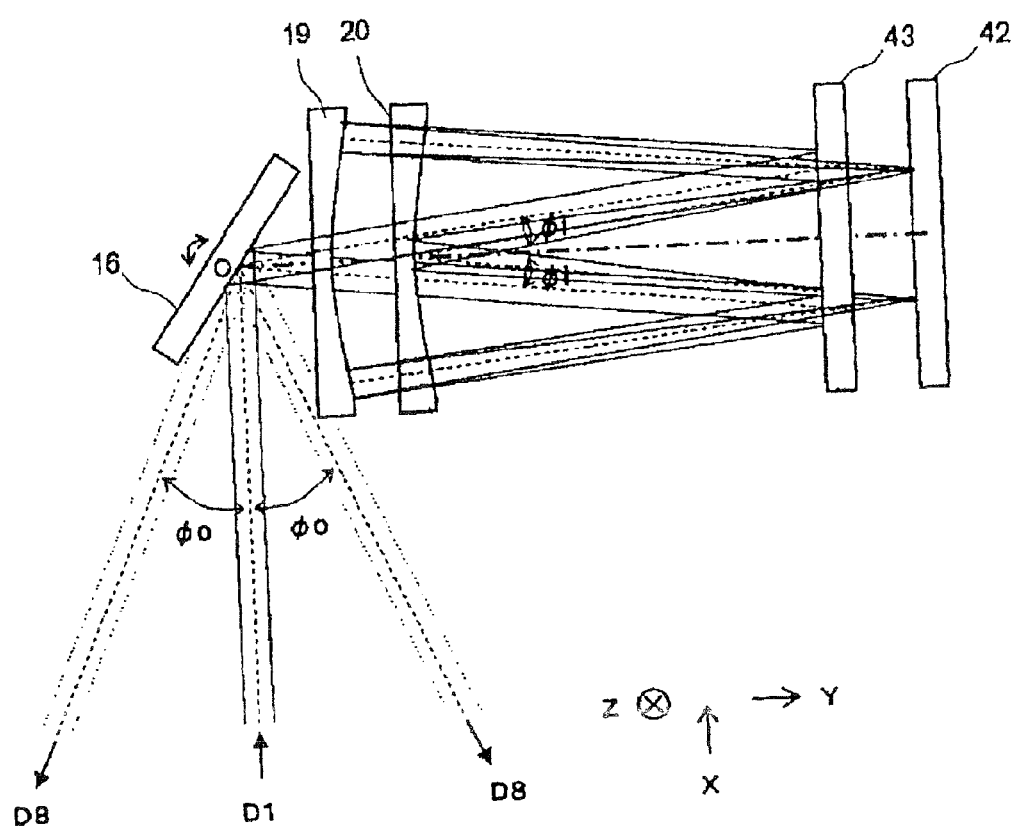
FIG. 29 is a diagram of the configuration of the transfer optical system according to the sixth exemplary embodiment as viewed in the Z direction.

FIG. 28 is a diagram of transfer optical system 17 as viewed in the X direction. Furthermore, FIG. 29 is a diagram of transfer optical system 17 as viewed in the Z direction.

First, the configuration of transfer optical system 17 as viewed in the X direction will be described with reference to FIG. 28.

As is the case with the first exemplary embodiment, the angle between normal E1 of scan mirror 16 and incident light beam D1 entering scan mirror 16 is defined as $\theta i$. Furthermore, the angle between normal E1 of scan mirror 16 and exit light beam D8 leaving scan mirror 16 is defined as $\theta o$.

Furthermore, the distance between the center of scan mirror 16 and the center of reflection mirror 43 is defined as f0(s0/2). The distance between the center of reflection mirror 43 and the center of concave mirror 19 is defined as f0.

The angle between normal E1 of scan mirror 16 and line E2 joining the center of scan mirror 16 with the center of reflection mirror 43 is $(\theta o - \theta i)/2$. Moreover, the angle between normal E8 of reflection mirror 43 and line E2 joining the center of scan mirror 16 with the center of reflection mirror 43 is $(\theta o - \theta i)/2$.

The angle between normal E3 of concave mirror 19 and line E4a joining the center of reflection mirror 43 with the center of concave mirror 19 is $(\theta o - \theta i)/2$.

The angle between normal E7 of reflection mirror 42 and line E4b joining the center of concave mirror 19 with the center of reflection mirror 42 is $(\theta o - \theta i)/2$. Furthermore, the distance between the center of concave mirror 19 and the center of reflection mirror 42 is f0.

The angle between normal E5 of concave mirror 20 and line E4c joining the center of reflection mirror 42 with the center of concave mirror 20 is zero degree. Furthermore, the distance between the center of reflection mirror 42 and the center of concave mirror 20 is s1(2f1)

Now, the configuration of transfer optical system 17 as viewed in the Z direction will be described with reference to FIG. 28.

As is the case with the first embodiment, reflected light beams resulting from scanning of incident light beam D1 at maximum scan angle $\pm\phi i$ by scan mirror 16 are defined as D2 and D2', respectively.

The angle between line E2 joining the center of scan mirror 16 with the center of reflection mirror 42 and the center line between light beams D2 and D2' is zero degree. Furthermore, the angle between normal E8 of reflection mirror 43 and the center line between light beams D2 and D2'is zero degree.

Furthermore, the angle between normal E8 of reflection mirror 43 and line E4a joining the center of reflection mirror 43 with the center of concave mirror 19 is zero degree.

Additionally, the angle between normal E3 of concave mirror 19 and line E4b joining the center of concave mirror 19 with the center of reflection mirror 42 is zero degree.

In addition, the angle between normal E7 of reflection mirror 42 and line E4c joining the center of reflection mirror 42 with the center of concave mirror 20 is zero degree.

Moreover, the angle between normal E5 of concave mirror 20 and line E4c joining the center of reflection mirror 42 with the center of concave mirror 20 is zero degree.

Description of Operation

Now, the operation of transfer optical system 17 will be described with reference to FIG. 28.

First, the operation of transfer optical system 17 as viewed in the X direction will be described.

First, incident light beam D1 enters scan mirror 16 at angle $\theta i$ to normal E1 of scan mirror 16.

Subsequently, incident light beam D1 is reflected by scan mirror 16, and resultant light beam D2 enters reflection mirror 43 at angle $\theta i$ to normal E8 of reflection mirror 43.

Moreover, light beam D2 is reflected by reflection mirror 43, and resultant light beam D3 enters concave mirror 19 at angle $\theta i$ to normal E3 of concave mirror 19.

Then, light beam D3 is reflected by concave mirror 19, and resultant light beam D4 enters reflection mirror 42. Light beam D4 is focused at the position of incidence on reflection mirror 42 so as to have the minimum diameter.

Then, light beam D4 is reflected by reflection mirror 42, and resultant light beam D5 enters the center of concave mirror 20.

Subsequently, light beam D5 is reflected by concave mirror 20, and resultant light beam D6 enters reflection mirror 42. Light beam D6 is focused at the position of incidence on reflection mirror 42 so as to have the minimum diameter.

Moreover, light beam D6 is reflected by reflection mirror 42, and resultant light beam D7 enters concave mirror 19 at angle $\theta o$ to normal E3 of concave mirror 19.

Moreover, light beam D7 is reflected by concave mirror 19, and resultant light beam D8 enters reflection mirror 43 at angle $\theta o$ to normal E8 of reflection mirror 43. Then, light beam D8 is collimated, by concave mirror 19, into parallel light with the same diameter as that of light beam D1.

Thereafter, light beam D8 is reflected by reflection mirror 43, and resultant light beam D9 enters scan mirror 16 at angle θo to normal E1 of scan mirror 16.

Then, light beam D9 is reflected by scan mirror 16, and resultant light beam D10 is emitted at angle θo to normal E1 of scan mirror 16.

Now, the operation of transfer optical system 17 as viewed in the Z direction will be described with reference to FIG. 29.

As is the case with the first embodiment, normals of scan mirror 16 resulting from the maximum deflection of scan mirror 16 are defined as E1 and E1'. Normals of scan mirror 16 resulting from the maximum deflection of scan mirror 16 are defined as E1 and E1', respectively. Furthermore, the angle between incident light beam D1 and normal E1 of scan mirror 16 is defined as φs. The angle between incident light beam D1 and normal E1' of scan mirror 16 is defined as φs'.

First, the case where scan mirror 16 has normal E1 will be described.

First, incident light beam D1 enters scan mirror 16 at angle φs to normal E1 of scan mirror 16.

Subsequently, incident light beam D1 is reflected by scan mirror 16, and resultant light beam D2 enters reflection mirror 43 at angle φi to normal E8 of reflection mirror 43.

Moreover, light beam D2 is reflected by reflection mirror 43, and resultant light beam D3 enters concave mirror 19 at angle φi to normal E3 of concave mirror 19.

Then, light beam D3 is reflected by concave mirror 19, and resultant light beam D4 enters reflection mirror 42. Light beam D4 is focused at the position of incidence of reflection mirror 42 so as to have the minimum diameter.

Moreover, light beam D4 is reflected by reflection mirror 42, and resultant light beam D5 enters the center of concave mirror 20.

Thereafter, light beam D5 is reflected by concave mirror 20, and resultant light beam D6 enters reflection mirror 42. Light beam D6 is focused at the position of incidence of reflection mirror 42 so as to have the minimum diameter.

Subsequently, light beam D6 is reflected by reflection mirror 42, and resultant light beam D7 enters concave mirror 19 at angle φi to normal E3 of concave mirror 19.

Moreover, light beam D7 is reflected by concave mirror 19, and resultant light beam D8 enters reflection mirror 43 at angle φi to normal E8 of reflection mirror 43. Then, light beam D8 is collimated, by concave mirror 19, into parallel light with the same diameter as that of light beam D1.

Moreover, light beam D8 is reflected by reflection mirror 43, and resultant light beam D9 enters scan mirror 16 at angle φi to normal E1 of scan mirror 16.

Thereafter, light beam D9 is reflected by scan mirror 16, and resultant light beam D10 is emitted at angle (φs−2φi) to normal E1 of scan mirror 16. Thus, light beam D10 is emitted at angle 2φi to incident light beam D1.

Now, the case where scan mirror 16 has normal E1' will be described.

First, incident light beam D1' enters scan mirror 16 at angle φs' to normal E1' of scan mirror 16.

Subsequently, incident light beam D1 is reflected by scan mirror 16, and resultant light beam D2' enters reflection mirror 43 at angle φi to normal E8 of reflection mirror 43.

Moreover, light beam D2' is reflected by reflection mirror 43, and resultant light beam D3' enters concave mirror 19 at angle φi to normal E3 of concave mirror 19.

Moreover, light beam D3' is reflected by concave mirror 19, and resultant light beam D4' enters reflection mirror 42. Light beam D4 is focused at the position of incidence of reflection mirror 42 so as to have the minimum diameter.

Moreover, light beam D4' is reflected by reflection mirror 42, and resultant light beam D5' enters the center of concave mirror 20.

Thereafter, light beam D5' is reflected by concave mirror 20, and resultant light beam D6' enters reflection mirror 42. Light beam D4 is focused at the position of incidence of reflection mirror 42 so as to have the minimum diameter.

Subsequently, light beam D6' is reflected by reflection mirror 42, and resultant light beam D7' enters concave mirror 19 at angle φi to normal E3 of concave mirror 19.

Moreover, light beam D7' is reflected by concave mirror 19, and resultant light beam D8' enters reflection mirror 43 at angle φi to normal E8 of reflection mirror 43. Then, light beam D8' is collimated, by concave mirror 19, into parallel light having the same diameter as that of light beam D1'.

Moreover, light beam D8' is reflected by reflection mirror 43, and resultant light beam D9' enters scan mirror 16 at angle φi to normal E1 of scan mirror 16.

Thereafter, light beam D9' is reflected by scan mirror 16, and resultant light beam D10' is emitted at angle (φs'−2φi) to normal E1 of scan mirror 16. Thus, light beam D10' is emitted at angle 2φi to incident light beam D1'.

Furthermore, as described above, light beam D10 is emitted at angle 2φi to incident light beam D1. Hence, the angle between light beams D10 and D10' is 4φi. Thus, the scan angle of scan mirror 16 can be increased to double by transfer optical system 17.

Description of Effects

In the exemplary embodiment, reflection mirror 42 is located on the optical path between concave mirrors 19 and 20. Furthermore, reflection mirror 43 is located on the optical path between scan mirror 16 and concave mirror 19.

In this case, the laser light beam traveling between concave mirrors 19 and 20 can be folded back by reflection mirror 42. Furthermore, the laser light beam traveling between concave mirrors 19 and 20 can be folded back by reflection mirror 43. This enables optical scanning device 3 to be further miniaturized.

For example, it is assumed that reflection mirror 42 is provided at the position of focal distance f0 along the optical path from concave mirror 19 and that reflection mirror 43 is provided at the position of focal distance f0(S0/2) along the optical path from concave mirror 19. In this case, the length of the optical scanning device in the Y direction can be set equal to or smaller than the longer of focal distance f0 of concave mirror 19 and the double (s1) of focal distance f1 of concave mirror 20.

Furthermore, in the present exemplary embodiment, reflection mirrors 42 and 43 are both located at the position of focal distance f0 of concave mirror 19. In this case, reflection mirrors 42 and 43 lie in line in the Z direction. Hence, reflection mirrors 42 and 43 can be integrated together. Therefore, the device configuration can be simplified, enabling, for example, simple adjustment of optical scanning device 3.

Furthermore, in the exemplary embodiment, if focal distance f0 of concave mirror 19 is equal to the double of focal distance f1 of concave mirror 20, concave mirrors 19 and 20 lie in line in the Z direction. In this case, concave mirrors 19 and 20 can be integrated together. Therefore, the device configuration can be simplified, enabling, for example, simple adjustment of optical scanning device 3.

The present invention has been described above with reference to the exemplary embodiments. However, the present invention is not limited to the above-described exemplary embodiments. Various changes understandable to those skilled in the art may be made to the components and details of the present invention without departing from the scope of the present invention.

The present application claims priority based on JP2007-307511A filed on Nov. 28, 2007 and incorporates the entirety of the disclosure thereof.

The invention claimed is:

1. An optical scanning device comprising a scan mirror configured to reflect and scan an incident light beam, and a transfer optical system configured to receive the light beam scanned by the scan mirror and to allow the light beam to enter the scan mirror again, the optical scanning device being characterized in that:
   the transfer optical system comprises a first concave mirror, a second concave mirror, a third concave mirror, and a fourth concave mirror, and a first reflection mirror,
   the first concave mirror reflects the light beam scanned by the scan mirror in such a manner that the light beam enters the second concave mirror,
   the second concave mirror reflects the light beam received from the first concave mirror in such a manner that the light beam enters the first reflection mirror,
   the first reflection mirror allows the light beam received from the second concave mirror to enter the third concave mirror,
   the third concave mirror reflects the light beam received from the first reflection mirror in such a manner that the light beam enters the fourth concave mirror,
   the fourth concave mirror reflects the light beam received from the third concave mirror in such a manner that the light beam enters the scan mirror, and
   the scan mirror scans and emits the light beam received via the first concave mirror, the second concave mirror, the third concave mirror, and the fourth concave mirror, to a plane of projection.

2. The optical scanning device according to claim 1, wherein a position of incidence of the light beam on the scan mirror is conjugate to a position of incidence of the light beam on the reflection mirror.

3. The optical scanning device according to claim 2, wherein the first reflection mirror is a scan mirror configured to scan the light beam received from the second concave mirror, in a direction different from a scanning direction of the scan mirror and to allow the light beam to enter the third concave mirror.

4. The optical scanning device according to claim 1, wherein the first concave mirror, the second concave mirror, the third concave mirror and the fourth concave mirror each has power only in a direction along a scan line placed on the concave mirror by the scan mirror.

5. An image output apparatus comprising:
   the optical scanning device according to claim 1; and
      an image signal output device configured to allow a light beam to enter the optical scanning device in accordance with an image signal.

6. An optical scanning device comprising a scan mirror configured to reflect and scan an incident light beam, and a transfer optical system configured to receive the light beam scanned by the scan mirror and to allow the light beam to enter the scan mirror again, the optical scanning device being characterized in that:
   the transfer optical system comprises a first concave mirror and a second concave mirror,
   the first concave mirror reflects the light beam scanned by the scan mirror in such a manner that the light beam enters the second concave mirror, and reflects the light beam received from the second concave mirror in such a manner that the light beam enters the scan mirror, and
   the second concave mirror reflects the light beam received from the first concave mirror in such a manner that the light beam enters the first concave mirror.

7. The optical scanning device according to claim 6, wherein a position of incidence of the light beam on the scan mirror is conjugate to a position of incidence of the light beam on the second concave mirror.

8. The optical scanning device according to claim 6, wherein the transfer optical system further comprises:
   a third reflection mirror located on an optical path between the scan mirror and the first concave mirror; and
   a fourth reflection mirror located on an optical path between the first concave mirror and the second concave mirror.

* * * * *